(12) United States Patent
Banthia et al.

(10) Patent No.: US 11,008,177 B2
(45) Date of Patent: May 18, 2021

(54) GRAIN CART WITH AUTOMATED UNLOADING ASSISTANCE

(71) Applicant: Elmer's Welding & Manufacturing Ltd., Altona (CA)

(72) Inventors: Vikram Banthia, Altona (CA); Michael Ian James Friesen, Altona (CA)

(73) Assignee: ELMER'S WELDING + MANUFACTURING LTD., Altona (CA)

( * ) Notice: Subject to any disclaimer, the term of this patent is extended or adjusted under 35 U.S.C. 154(b) by 240 days.

(21) Appl. No.: 16/391,897

(22) Filed: Apr. 23, 2019

(65) Prior Publication Data
US 2019/0322461 A1 Oct. 24, 2019

Related U.S. Application Data

(60) Provisional application No. 62/661,938, filed on Apr. 24, 2018.

(51) Int. Cl.
| | |
|---|---|
| *B65G 43/00* | (2006.01) |
| *B60P 1/56* | (2006.01) |
| *B65G 67/24* | (2006.01) |
| *A01D 90/10* | (2006.01) |
| *B65G 65/46* | (2006.01) |
| *B60P 1/42* | (2006.01) |

(52) U.S. Cl.
CPC ............. *B65G 43/00* (2013.01); *A01D 90/10* (2013.01); *B60P 1/42* (2013.01); *B60P 1/56* (2013.01); *B65G 65/466* (2013.01); *B65G 67/24* (2013.01); *B65G 2814/0325* (2013.01); *B65G 2814/0344* (2013.01)

(58) Field of Classification Search
CPC ...... B65G 43/00; B65G 65/466; B65G 67/24; B65G 2814/0325; B65G 2814/0344; A01D 90/10; B60P 1/42; B60P 1/56
USPC .......................................................... 701/50
See application file for complete search history.

(56) References Cited

U.S. PATENT DOCUMENTS

2013/0269735 A1* 10/2013 Roetzel .................. B08B 3/102
134/40
2017/0268192 A1* 9/2017 Biley ..................... A01D 44/00

* cited by examiner

*Primary Examiner* — Gertrude Arthur Jeanglaude
(74) *Attorney, Agent, or Firm* — Ryan W. Dupuis; Kyle R. Satterthwaite; ADE & Company Inc.

(57) ABSTRACT

A control assembly provides autonomous control of various functions of a grain cart and/or provides guidance to an operator of the grain cart during the unloading of a grain cart. The control assembly collects input from one or more sensors including a speed sensor to monitor speed of a PTO that drives the unloading auger of the grain cart, a height sensor that measures the height of material discharged from the grain cart into a receptacle such as a grain truck, and/or a boundary sensors that measure lateral position of the grain cart relative to the receptacle or grain truck. Based on the input, the control assembly may vary the position of the discharge gate of the grain cart, or provide guidance to the operator to steer and position the grain cart relative to an adjacent grain truck.

20 Claims, 12 Drawing Sheets

GRAIN CART WITH AUTOMATED UNLOADING ASSISTANCE

This application which claims the benefit under 35 U.S.C.119(e) of U.S. provisional application Ser. No. 62/661,938, filed Apr. 24, 2018.

FIELD OF THE INVENTION

The present invention relates to a control assembly for providing autonomous control of some of the functions of a grain cart and for providing guidance to an operator of the grain cart during the unloading of a grain cart.

BACKGROUND

A grain cart is a farm implement that is typically towed behind a tractor and is used to transport harvested grain from combines and deliver the grain to trucks or other hauling devices away from the harvest field. The use of grain carts allows the harvester to remain in the field without having to return to a grain storage area to unload.

Grain carts include a storage bin that further includes a hopper with large capacity ranging from several hundred to over 2000 bushels; around 30 tons (60,000 lb.) is average. To unload the grain from the cart, grain carts employ a conveying device such as an auger to draw grain from the bottom of the hopper and carry it through a chute that deposits the grain wherever it is needed. To provide power to the auger, grain carts are typically driven by a Power Take-Off ("PTO") driveshaft located at the rear end of a tractor or a hydraulic motor and is powered by the tractor's engine. At the bottom of the hopper, where the auger meets the hopper, is a gate that must be opened for grain to flow onto the auger. The hopper gates are usually hydraulically (or electrically) actuated and are powered by tractor's hydraulics (or electricals). The gates keep the grain in the hopper until the operator desires to remove the material and allows the auger to come up to speed while under minimal load before the grain is loaded onto the auger. Without gates separating the grain in the hopper from the auger, the auger would have to bear the entire weight of the grain present in the grain cart to begin conveying grain up the auger. Typical PTOs are not capable of generating the necessary torque to overcome such a load. Moreover, if the conveyor is not up to the proper speed prior to opening of the gates, the increased load may cause the engine driving the PTO, to stall, or other equipment to malfunction. To minimize the risk of stalling and malfunction, grain cart operators must always be conscious of their engine rpms before starting the unloading process.

The unloading process consists of a grain cart towed behind a tractor traveling alongside the stationary truck with a tank, which gets filled with the grain. Traditionally, the tractor operator would steer the tractor parallel to the truck, engage the PTO driveshaft and operate the tractor hydraulics to control the grain cart hopper gates for unloading the grain. The tractor engine must thus supply enough power for running the PTO driveshaft, operating the hydraulic or electric actuators for gate open/close, and towing the cart forward as the truck gets filled up with grain. These operations require considerable amount of tractor's engine power and there are periods when it is unable to provide adequate power, which eventually leads to the engine stalling and other equipment malfunctioning. Moreover, during the unloading process, there are several other functions the operator must monitor, like the spout direction, unload weights etc. With such operations to be continuously monitored by the operator, it requires a lot of effort and concentration to not cause a stall or other undesirable results such as a spill.

Grain cart operators are tasked with maintaining coordination of several simultaneous operations. For example, in addition to the operator propelling the tractor and grain cart alongside the stationary truck with a tank while the tank is filled with the grain, the tractor operator must steer the tractor parallel to the truck being loaded, while also operating the tractor hydraulics to control the grain cart hopper gates for unloading the grain from the grain cart. Additionally, he must make sure the unloading auger is unloading grain into the tank and once the unloading process starts he must observe the fill status of the truck such that it does not overfill. This adds another task for the tractor operator. A well-practiced tractor operator can make this operation work, but when one person is inexperienced, the operational capacity of the grain cart can be substantially decreased. Grain unloading can significantly increase operator fatigue resulting from many hours working in the field. Continuous performance of these tasks can lead to operator stress, resulting in decreased harvest efficiency.

In search of efficiency, agricultural producers are now turning towards automation for the process of unloading of grain carts. Systems have been developed to assist the operator in unloading with adjusting the spout and maintaining proper spacing between the two operating machines. Some systems are even capable of automated control of some of these processes. Although these systems are helpful, the status of the fill level in the truck still requires the operator's constant attention to ensure the systems are operating properly and the grain does not spill at any point.

SUMMARY OF THE INVENTION

It would be advantageous to develop an unloading system that assists an operator by automatically controlling the gate of the unloading auger to be able to fill the truck evenly and to avoid overfills. Furthermore, it would be advantageous to develop an unloading system that assists an operator by automatically controlling the gate of the unloading auger based on PTO speeds to avoid tractor engine to stall.

According to one aspect of the invention there is provided a control assembly for an agricultural implement comprising a hopper container having a discharge opening at a bottom end of the hopper container, an unloading auger supported relative to the hopper container to receive material discharged from the hopper container through the discharge opening, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, and a drive assembly adapted to connect the unload auger to a power-take-off shaft of an auxiliary implement for driving rotation of the unload auger according to a rotation speed of the power-take-off shaft, the control assembly comprising:

a speed sensor adapted to measure the rotation speed of the power-take-off shaft;

a controller for operative communication with the speed sensor and the gate actuator;

the controller including a memory storing a minimum threshold and programming instructions thereon and a processor for executing the programming instructions so as to be configured to:

compare the measured rotation speed from the speed sensor to the minimum threshold; and generate a closing signal for the gate actuator to displace the gate at least partway towards the closed position responsive to the measured rotation speed from the speed sensor falling below the minimum threshold.

The controller may be arranged to generate the closing signal so as to displace the gate fully towards the closed position responsive to the measured rotation speed from the speed sensor falling below the minimum threshold.

The controller may also be arranged to generate a partial closing signal so as to displace the gate only partway from the open position towards the closed position responsive to the measured rotation speed from the speed sensor being above the minimum threshold but falling below an intermediate threshold which is greater than the minimum threshold. Alternatively, the controller may be arranged to generate a partial opening signal so as to displace the gate only partway from the closed position towards the open position responsive to the measured rotation speed from the speed sensor being above the minimum threshold but falling below an intermediate threshold which is greater than the minimum threshold.

When the control assembly further includes a display screen for mounting in an operator cab of the auxiliary implement, the controller may be arranged to generate a display signal which displays the measured rotation speed from the speed sensor on the display screen.

When the control assembly further includes a gate position sensor adapted to measure a position of the gate between the open position and the closed position thereof, the controller may be arranged to actuate the gate actuator until the gate position sensor indicates that the gate has reached a position prescribed by the controller. In this instance, the controller may be further arranged to generate gate signals for positioning the gate throughout a range of intermediate positions between the open position and the closed position proportionally to the measured rotation speed from the speed sensor.

When the control assembly further includes a height sensor for being supported on the unloading auger so as to be adapted to measure a height of material discharged into a receiving container relative to the height sensor, the controller may be further configured to: (i) compare the measured height of material from the height sensor to the height threshold, and (ii) generate a gate signal for the gate actuator to displace the gate at least partway towards the closed position responsive to the measured height of material from the height sensor meeting the height threshold.

Alternatively, the controller may be configured to generate an output signal when the measured height of material from the height sensor meets the height threshold. The output signal may comprise a notification signal for notifying an operator of the agricultural implement.

When the control assembly includes at least one boundary sensor for being supported on the agricultural implement so as to be adapted to measure a lateral distance therefrom to a boundary wall of a receiving container that receives material from the unload auger, the controller may be further configured to:

compare the measured lateral distance from said at least one boundary sensor to the boundary wall of the receiving container to the boundary criteria; and generate a gate signal for the gate actuator to displace the gate towards the closed position responsive to the measured lateral from said at least one boundary sensor meeting the boundary criteria.

According to another important independent aspect of the present invention there is provided a control assembly for an agricultural implement comprising a hopper container having a discharge opening at a bottom end of the hopper container, an unloading auger supported relative to the hopper container to receive material discharged from the hopper container through the discharge opening, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, and a drive assembly adapted to connect the unload auger to a power-take-off shaft of an auxiliary implement for driving rotation of the unload auger according to a rotation speed of the power-take-off shaft, the control assembly comprising:

a speed sensor adapted to measure the rotation speed of the power-take-off shaft;

a controller for operative communication with the speed sensor and the gate actuator;

the controller including a memory storing a gate position criteria and programming instructions thereon and a processor for executing the programming instructions so as to be configured to:

compare the measured rotation speed from the speed sensor to the gate position criteria; and generate a gate signal for the gate actuator to displace the gate to an intermediate position between the open and closed positions responsive to the measured rotation speed from the speed sensor meeting the gate position criteria.

The gate position criteria may include a minimum threshold and an intermediate threshold in which the controller is arranged to generate the gate signal to displace the gate to the intermediate position responsive to the measured rotation speed from the speed sensor being above the minimum threshold but falling below the intermediate threshold. The controller may further be arranged to generate a partial opening signal so as to displace the gate only partway from the closed position towards the open position responsive to the measured rotation speed from the speed sensor being above the minimum threshold but falling below the intermediate threshold.

When the assembly includes a display screen for mounting in an operator cab of the auxiliary implement, the controller may be arranged to generate a display signal which displays the measured rotation speed from the speed sensor on the display screen.

When the assembly includes a gate position sensor adapted to measure a position of the gate between the open position and the closed position thereof, the controller may be arranged to actuate the gate actuator until the gate position sensor indicates that the gate has reached a position prescribed by the controller.

The controller may be further arranged to generate gate signals for positioning the gate throughout a range of intermediate positions between the open position and the closed position proportionally to the measured rotation speed from the speed sensor.

According to another important independent aspect of the present invention there is provided a control assembly for an agricultural implement comprising a hopper container having a discharge opening at a bottom end of the hopper container, an unloading auger supported relative to the hopper container to receive material discharged from the hopper container through the discharge opening and dispense the material from the unloading auger into a receiving container of an auxiliary implement, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, the control assembly comprising:

a height sensor for being supported on the unloading auger so as to be adapted to measure a height of material discharged into the receiving container relative to the height sensor;

a controller for operative communication with the height sensor and the gate actuator;

the controller including a memory storing a height threshold and programming instructions thereon and a processor for executing the programming instructions so as to be configured to:

compare the measured height of material from the height sensor to the height threshold; and generate a gate signal for the gate actuator to displace the gate at least partway towards the closed position responsive to the measured height of material from the height sensor meeting the height threshold.

The controller may be arranged to generate an output signal responsive to the measured height of material from the height sensor meeting the height threshold, and generate the gate signal for the gate actuator to displace the gate at least partway towards the closed position if the measured height of material from the height sensor continues to meet the height threshold after expiration of an elapsed duration from the generation of the notification signal. The output signal may comprise a notification signal for notifying an operator of the agricultural implement. In this instance, the controller may be arranged to generate the notification signal to notify an operator of the agricultural implement responsive to the measured height of material from the height sensor continuing to meet the height threshold for a prescribed duration.

When the control assembly further includes at least one boundary sensor supported on the agricultural implement so as to be adapted to measure a lateral distance therefrom to a boundary wall of the receiving container, the controller may be further configured to: (i) compare the measured lateral distance from said at least one boundary sensor to the boundary wall of the receiving container to the boundary criteria; and (ii) generate a gate signal for the gate actuator to displace the gate towards the closed position responsive to the measured lateral from said at least one boundary sensor meeting the boundary criteria.

The controller may be arranged to autonomously set the height threshold to correspond to a maximum height measured by the height sensor during an initial calibration mode.

The controller may be arranged to generate an opening signal for the gate actuator to displace the gate at least partway towards the open position from the closed position responsive to the measured height from the height sensor returning below the height threshold.

When the controller further includes a speed sensor adapted to measure the rotation speed of the unload auger, the controller may be further configured to: (i) compare the measured rotation speed from the speed sensor to a minimum threshold; and (ii) generate a closing signal for the gate actuator to displace the gate at least partway towards the closed position responsive to the measured rotation speed from the speed sensor falling below the minimum threshold.

When the controller further includes at least one boundary sensor for being supported on the agricultural implement so as to be adapted to measure a lateral distance therefrom to a boundary wall of the receiving container, the controller may be further configured to: (i) compare the measured lateral distance from said at least one boundary sensor to the boundary wall of the receiving container to a first lateral distance threshold and a second lateral distance threshold; (ii) generate a first steering output signal responsive to the measured lateral from said at least one boundary sensor meeting the first lateral distance threshold; and (iii) generate a second steering output signal responsive to the measured lateral from said at least one boundary sensor meeting the second lateral distance threshold. For example, the first steering output signal may be a first notification signal for notifying an operator to steer in a first direction responsive to the measured lateral from said at least one boundary sensor meeting the first lateral distance threshold, and the second steering output signal may be a second notification signal for notifying an operator to steer in a second direction responsive to the measured lateral from said at least one boundary sensor meeting the second lateral distance threshold.

According to another important independent aspect of the present invention there is provided a control assembly for an agricultural implement comprising a hopper container having a discharge opening at a bottom end of the hopper container, an unloading auger supported relative to the hopper container to receive material discharged from the hopper container through the discharge opening and dispense the material from the unloading auger into a receiving container of an auxiliary implement, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, the control assembly comprising:

a height sensor for being supported on the unloading auger so as to be adapted to measure a height of material discharged into the receiving container relative to the height sensor;

a controller for operative communication with the height sensor;

the controller including a memory storing a height threshold and programming instructions thereon and a processor for executing the programming instructions so as to be configured to:

compare the measured height of material from the height sensor to the height threshold; and generate an output signal when the measured height of material from the height sensor meets the height threshold.

In the illustrated embodiment, the output signal comprises a notification signal for notifying an operator of the agricultural implement. Alternatively, the output signal may be a control signal for operating autonomous controls of the tractor and/or agricultural implement.

The output signal may comprise a notification signal for notifying an operator of the agricultural implement, in which the controller may be arranged to generate the output signal only once the measured height of material from the height sensor continues to meet the height threshold for a prescribed duration. The controller may be arranged to autonomously set the height threshold to correspond to a maximum height measured by the height sensor during an initial calibration mode.

According to another important independent aspect of the present invention there is provided a control assembly for an agricultural implement comprising a hopper container having a discharge opening at a bottom end of the hopper container, an unloading auger supported relative to the hopper container to receive material discharged from the hopper container through the discharge opening and dispense the material from the unloading auger into a receiving container of an auxiliary implement, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, the control assembly comprising:

at least one boundary sensor for being supported on the agricultural implement so as to be adapted to measure a lateral distance therefrom to a boundary wall of the receiving container;

a controller for operative communication with said at least one boundary sensor and the gate actuator;

the controller including a memory storing boundary criteria and programming instructions thereon and a processor for executing the programming instructions so as to be configured to:

compare the measured lateral distance from said at least one boundary sensor to the boundary wall of the receiving container to the boundary criteria; and generate a gate signal for the gate actuator to displace the gate towards the closed position responsive to the measured lateral from said at least one boundary sensor meeting the boundary criteria.

According to another important independent aspect of the present invention there is provided a control assembly for an agricultural implement comprising a hopper container having a discharge opening at a bottom end of the hopper container, an unloading auger supported relative to the hopper container to receive material discharged from the hopper container through the discharge opening and dispense the material from the unloading auger into a receiving container of an auxiliary implement, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, the control assembly comprising:

at least one boundary sensor for being supported on the agricultural implement so as to be adapted to measure a lateral distance therefrom to a boundary wall of the receiving container;

a controller for operative communication with said at least one boundary sensor and the gate actuator;

the controller including a memory storing boundary criteria and programming instructions thereon and a processor for executing the programming instructions so as to be configured to:

compare the measured lateral distance from said at least one boundary sensor to the boundary wall of the receiving container to a first lateral distance threshold and a second lateral distance threshold;

generate a first steering output signal responsive to the measured lateral from said at least one boundary sensor meeting the first lateral distance threshold; and generate a second steering output signal responsive to the measured lateral from said at least one boundary sensor meeting the second lateral distance threshold.

The first steering output signal may be a first notification signal for notifying an operator to steer in a first direction responsive to the measured lateral from said at least one boundary sensor meeting the first lateral distance threshold, and the second steering output signal may be a second notification signal for notifying an operator to steer in a second direction responsive to the measured lateral from said at least one boundary sensor meeting the second lateral distance threshold.

In the illustrated embodiment, the first steering output signal is a first notification signal for notifying an operator to steer in a first direction responsive to the measured lateral from said at least one boundary sensor meeting the first lateral distance threshold, and the second steering output signal is a second notification signal for notifying an operator to steer in a second direction responsive to the measured lateral from said at least one boundary sensor meeting the second lateral distance threshold. Alternatively, the output signals may be control signals for operating autonomous controls of the tractor and/or agricultural implement.

The preferred system described herein will continuously monitor the PTO speeds and alert the operator when it drops below a threshold and ultimately shut off the unloading auger gates. A sensor package mounted on the PTO driveshaft and gate's hydraulic cylinder would deliver PTO rpms and gate position information to a cart mounted controller that controls the automatic function of the hopper gate.

At each pass, the system preferably alerts the operator to drive the grain cart forward when the grain height has reached its peak and ultimately shut off the unloading auger gates if the driver does not drive the cart forward, when prompted to, to avoid any spills.

A sensor package which may be mounted on the unloading auger would deliver depth and geometric information of the truck tank to a cart mounted controller that controls the automatic function of the hopper gate. A number of different sensing technologies including machine vision, radar, or ultrasonic sensing technologies are possible candidates. Vision systems using cameras are used in a wide variety of applications including feature detection, vehicle guidance systems, medical image processing, and in manufacturing and control. However, they do have shortcomings, particularly when operating in an outdoor environment. Camera systems have difficulty in dealing with changes in scene illumination and are very sensitive to changes in ambient light intensity and direction. Camera vision systems are easily affected by dust: dust can shroud the view of the desired object and dust can collect on the lens of the camera degrading the effectiveness of the camera system. Ultrasonic sensors are an inexpensive alternative to a stereo camera, add to the accuracy of the vision system, and are unaffected by dust.

According to another independent aspect of the present invention there is provided a mobile farm equipment controlled by a controller, the controller being used for automating the hopper gate opening/closing, the controller configured to: (i) receive a first command to assist the unloading of grain from the grain cart; (ii) determine whether a power takeoff speed is above a threshold at which stall is unlikely; (iii) automatically open hopper gates to a preset value, in response to a determination that the power takeoff speed is above a particular threshold; and (iv) close the hopper gates again to a preset value, in response to a determination that the power takeoff speed is lower than a particular threshold.

According to another independent aspect of the present invention there is provided a mobile farm equipment controlled by a controller with memory, the controller being used for automating unloading of the mobile farm equipment, the controller configured to: (i) receive a first command to assist the unloading of grain from the mobile farm implement; (ii) prompt the operator to drive the grain cart towards the parked truck; (iii) identify the presence of truck by determining both the side sensors being active; (iv) save the truck edge distance value; (v) saves the distance value between the cart and truck; (vi) prompt the operator to switch on the PTO driveshaft; (vii) determine whether a power takeoff speed is above a threshold at which stall is unlikely; (viii) automatically open hopper gates, in response to a determination that the spout sensor value is lesser than the required grain height and that the power takeoff speed is above the threshold; (ix) prompt the operator to drive forward when the sensor reading has reached a steady value around the required grain height; (x) close the hopper gates, in response to a determination that the threshold time has passed at spout sensor values greater than the required grain height or if the power takeoff speed is lower than the threshold; (xi) prompt the operator to stop driving and open the hopper gates again, in response to measuring the spout sensor value to be lesser than the required grain height and the power takeoff speed is above the threshold; and (xii) close the hopper gates when sensor 1 is off and sensor 2 is on, asking the operator to disengage the power takeoff driveshaft to finish unloading.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
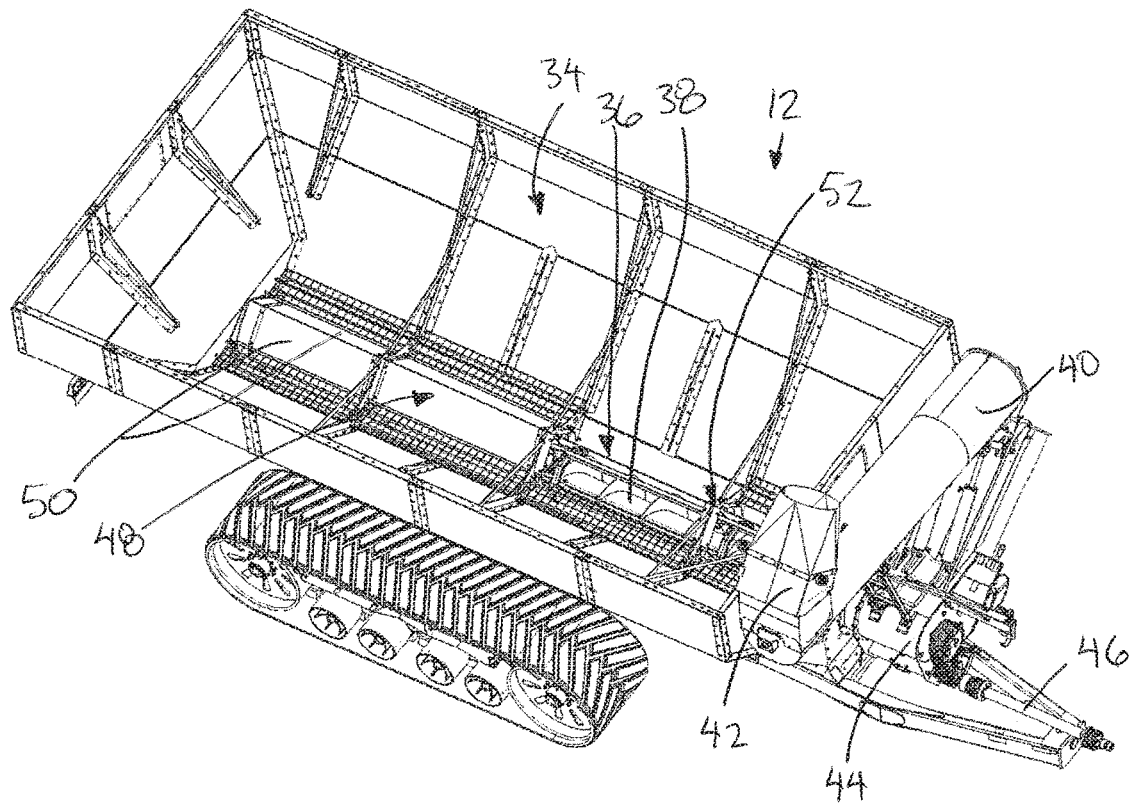
FIG. 1 is a perspective view of a grain cart relative to which the control assembly of the present invention is applied.
Figure 2:
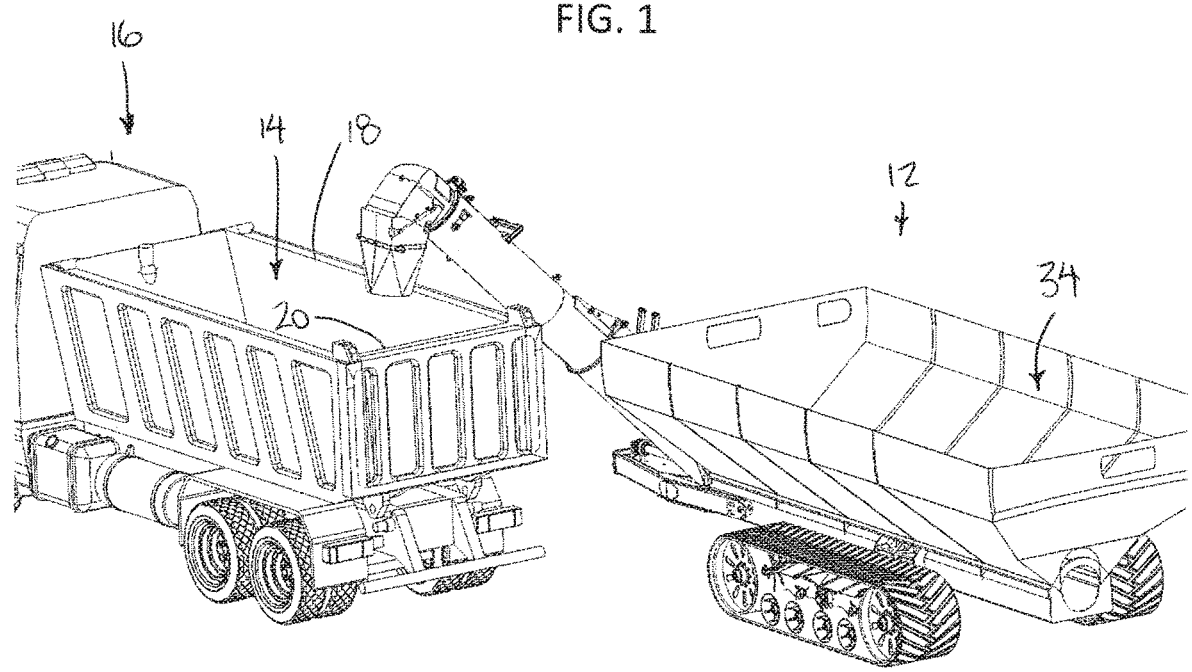
FIG. 2 is a perspective view of the grain cart in an unloading configuration relative to the receiving container of a grain truck.
Figure 3:
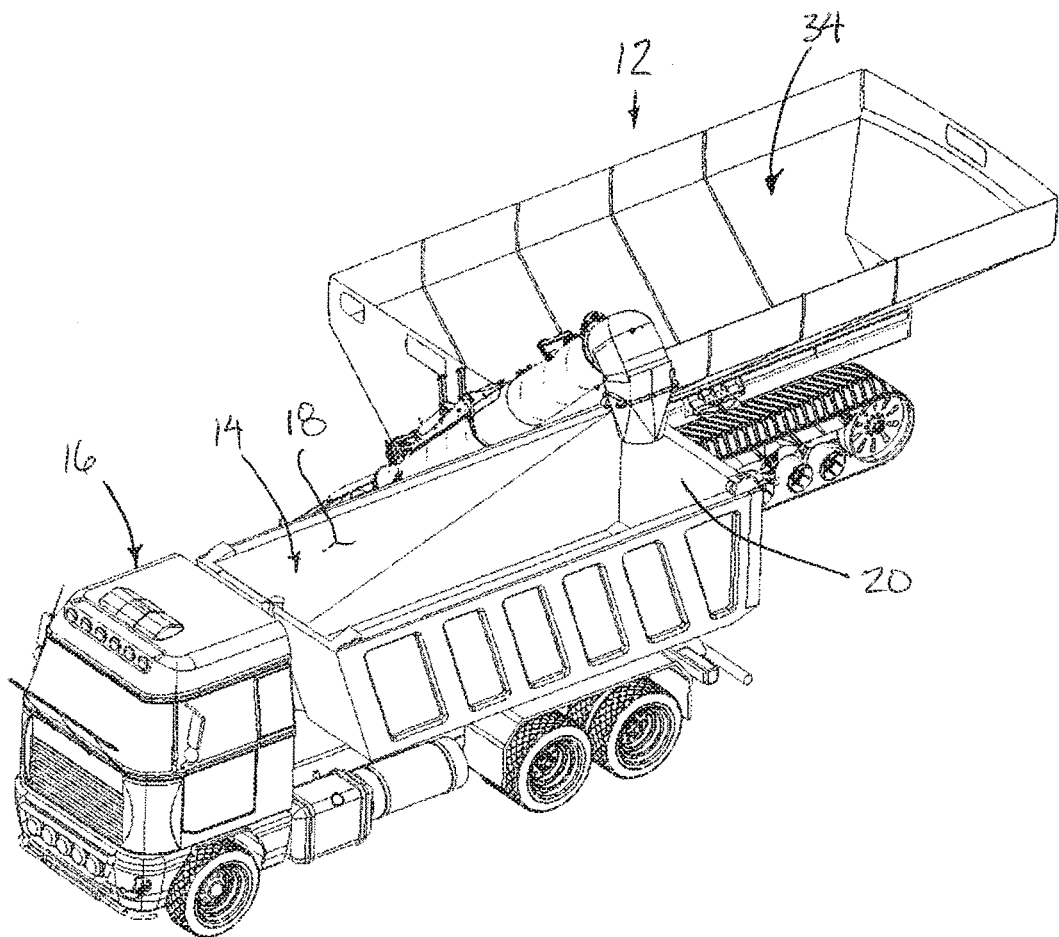
FIG. 3 is another perspective view of the grain cart being unloaded into the grain truck.

The present invention relates to an automated grain cart gate control system that ensures that the tractor engine running it, does not stall at any time. The system continuously monitors the PTO driveshaft speed and automatically controls the gate of the unloading auger to be able to avoid any tractor stalls. The operator is prompted when the PTO speed drops down to a value deemed unsafe for unloading and the gates automatically close at that point. According to a first mode of operation of the invention, the automatic gate control system uses two or more sensors. To accomplish these items, the following tasks must typically be completed: (i) monitor the power takeoff speed; (ii) monitor the hopper gates position, and (iii) control the hopper gates based on the real-time PTO sensor values.

Furthermore, the present invention relates to a low-cost intelligent system that would ensure optimum filling of grain from a grain cart into a truck when operated according to a second mode of operation. With the proposed system, the arduous task of monitoring the fill status of the truck by the operator at each pass is completely eliminated. The system continuously monitors the grain filling up in the truck and automatically controls the gate of the unloading auger to be able to fill the truck evenly and to avoid overspills. At each pass, the automated system alerts the operator to drive the grain cart forward based on the grain height measurements and ultimately shuts off the unloading auger gates if the driver does not drive the cart forward when the grain height is at its peak for a certain period of time. According to the invention, an automatic start/stop control uses one or more sensors to identify the presence of truck, detect highest truck edge, monitor the grain height and the PTO rpms. To accomplish these items, the following tasks must be completed: (i) identify the presence of truck by using the object detection information obtained by the ultrasonic sensors mounted on either side of the auger; (ii) identify the highest truck edge using distance information obtained by the spout ultrasonic sensors (which serves as the highest grain height peak desired at each pass); (iii) accurately measure the grain height inside the truck tank using distance information obtained by the spout ultrasonic sensors; (iv) monitor the power takeoff speed; (v) control the hopper gates and prompt the operator to stop or drive based on the real-time spout sensor values measuring the grain height.

Referring to the accompanying figures there is illustrated a grain cart control assembly generally indicated by reference numeral 10. The control assembly is particularly suited for providing automated control of various grain cart functions related to unloading of the grain cart 12 into the receiving container 14 of a transport truck 16. The receiving container in the illustrated embodiment is a dump box having a plurality of boundary walls 18 extending upwardly from of a bottom of the box to an open top end of the box. The boundary wall of the box at the rear end of the box is defined by a rear gate panel 20 which is hinged to allow opening of the rear of the box for dumping.

The grain cart is typically towed by an agricultural tractor 22 of the type including an engine 24 for driving one or more hydraulic pumps 26 which then drives operation of various functions of the tractor. More particularly the hydraulic pumps generate a flow of hydraulic fluid directed towards wheel motors 28 for driving the wheels of the tractor to propel the tractor along the ground. Hydraulic fluid from the pumps is also directed towards a power-take-off (PTO) shaft 30 at the rear of the tractor for connection to the grain cart to drive the unloading of the grain cart as described in further detail below. The tractor also includes an auxiliary output 32 that is also supplied with pressurized hydraulic fluid from the pumps 26 and which includes valves in connection therewith for controlling the output flow with suitable operator controls within the cab 34 of the tractor to control one or more auxiliary functions of an implement connected to the tractor.

A typical grain cart has a frame supported on wheels and including a hitch for connection to the tractor in a towing relationship. The grain cart further includes a hopper container 34 supported on the frame that includes a plurality of boundary walls surrounding an open top end and which extend generally downwardly and inwardly from the open top end to an elongated discharge opening 36 at the bottom end of the container. In this manner, particulate material contained within the container is guided downwardly by gravity along the tapering hopper walls to be discharged through the centrally located discharge opening at the bottom of the container.

An unloading auger assembly is provided for transferring particulate material discharged from the discharge opening 36 to the receiving container of the grain truck 16. The unloading auger assembly includes a bottom auger portion 38 which is generally horizontally oriented and located directly below the discharge opening to receive particulate material from the hopper container along the length of the bottom auger. A suitable housing surrounds the lower portion of the bottom auger but remains open to the discharge opening 36 thereabove. The unloading auger assembly further includes a lift auger portion 40 received within a respective tubular housing and connected in series with the bottom auger 38 at one end of the bottom auger. The lift auger portion 40 extends upwardly and laterally outwardly at an incline from an inlet end in communication with the bottom auger portion to an outlet end coupled to a discharge spout 42 from which particulate material from the grain cart is discharged. A suitable drive assembly is provided for connection to the unloading auger assembly to drive rotation of both auger portions. The drive assembly includes a gearbox 44 coupled at the intersection of the bottom auger portion 38 and the lift auger portion 40 and a drive shaft 46 coupled to the gearbox 44. The drive shaft 46 is adapted for connection to the PTO shaft of the tractor to receive an input rotation from the tractor which in turn drives the gearbox for driving rotation of both the bottom auger portion and the lift auger portion of the unloading auger assembly proportionally to the speed of rotation of the PTO shaft of the tractor.

A gate assembly 48 is located within the hopper container of the grain cart in the form of a plurality of panels 50 hinged along respective edges of the discharge opening so as to be collectively movable between a closed position in which the panels 50 collectively fully span and enclose the discharge opening to prevent the flow of particular material from the hopper container into the bottom auger portion 38 and an open position in which the discharge opening is substantially unobstructed by the hinged panels to allow particulate material to flow readily into the bottom auger portion of the unloading auger assembly. A suitable gate actuator 52 is provided in the form of one or more hydraulic linear actuators coupled between the frame of the grain cart and the hinged panels 50. The gate actuator 52 can be operatively connected to the auxiliary output 32 of the hydraulic systems of the tractor so as to enable operator control of the opening and closing of the gate assembly of the discharge opening of the grain cart. The gate actuator 52 may be further configured to allow the hinged panels to be displaced into any one of a plurality of different intermediate positions within a range between the open and closed positions as described in further detail below.

The control assembly 10 according to the present invention generally includes a controller 100 in the form of a computer device having a memory and a processor for executing programming instructions stored on the memory to execute the various functions of the control assembly as described herein. The controller may comprise a single computer device or one or more separate devices each comprising their own memory or processor distributed across one or more locations on the tractor or the grain cart respectively. Typically, the controller is mounted on the tractor in proximity to an operator cab for communication with an operator interface 102 mounted within the cab. The operator interface 102 typically comprises a display screen for displaying data or messages to the operator. The display may be touch sensitive to also function as an input device for receiving operator commands, or alternatively a separate input device may be provided for receiving operator commands.

In addition to the controller communicating with the display for outputting messages and notifications to the operator, the controller also communicates with the gate actuator 52 so as to be arranged to generate suitable opening and closing signals or other general gate operating signals as required to operate the gate actuator and position the gate assembly 48 at a selected position as prescribed by the programming instructions. The communication of the controller with the gate actuator may be accomplished by a wired connection using a suitable wiring harness, or alternatively through various commercially available wireless communication means.

The controller also communicates with a plurality of control sensors which are mounted at various locations on the grain cart, and/or on the tractor as described in the following. The sensors may similarly communicate with the controller by a wired connection through a wiring harness, or alternatively through various wireless communication means available to persons of ordinary skill in the art.

The control sensors include a gate sensor 104 mounted in communication with the hinged panels 50 or the gate actuator 52 for determining the position of the gate actuator, and in turn the position of the hinged panels of the gate assembly so as to determine if the gate assembly is in the open position, the closed position, or at any one of a plurality of intermediate positions between the open and closed positions. The gate sensor 104 is thus capable of generating a position signal having a value corresponding to the position of the gate assembly between open and closed positions which can be interpreted by the controller to indicate to the controller what the position of the gate assembly is.

The control sensors further include a speed sensor 106 which is typically mounted on the tractor in communication with the PTO shaft 30 for measuring the speed of rotation in units of revolutions per minute (RPM). Alternatively, the speed sensor can be mounted on the grain cart in communication with the drive shaft, or on another component of the unloading auger assembly to similarly measure the rotation speed. In either instance the measured value by the speed sensor will be proportional to the speed of rotation of the PTO shaft and/or the unloading auger assembly.

The control sensors also include a height sensor 108 mounted on the discharge spout 42 from which particulate material transferred from the grain cart is discharged when the unloading auger assembly is operated. The height sensor may comprise one or more redundant sensors which are oriented to measure a vertical height from the discharge spout to an object therebelow, for example the peak of a pile of particulate material which has been discharged from the spout. The distance value measured by the height sensor 108 is inversely proportional to the height of particulate material discharged into the receiving container. For instance, a smaller distance measured by the height sensor is indicative of a greater height of material which has been discharged into the receiving container.

The height sensor 108 can also be used at a calibration step for calibrating a height threshold which is stored on the controller in which the height threshold corresponds to the maximum fill height to which the unloading auger is permitted to operate when filling the receiving container of the grain truck. As described further below, when the spout passes over the top edge of the rear gate of the truck box, the minimum distance measured by the sensor 108 corresponds to the highest peak height recorded by the controller which is then subsequently stored on the controller as the height threshold so that the controller can choose to close the gate assembly and prevent further material being transferred by the unloading auger assembly once the height of grain sensed by the height sensors 108 when filling the receiving container exceeds the stored height threshold.

The control sensors also include a first boundary sensor 110 mounted on the frame of the grain cart at a location spaced forwardly of the spout 42 in the forward normal working direction of the grain cart and a second boundary sensor 112 mounted on the frame of the grain cart at a location spaced rearwardly of the discharge spout 42 while remaining in close proximity thereto. Each of the boundary sensors comprise ultrasonic sensors capable of measuring a lateral distance from the mounting location on the grain cart to the receiving container by being positioned at a suitable height corresponding to an intermediate location along the height of the boundary walls of the receiving container. When no lateral distance can be measured, this is interpreted by the controller to indicate that the corresponding boundary sensor is no longer aligned between the front and rear ends of the receiving container in the direction of travel of the grain cart alongside of the receiving container.

The height sensors and the boundary sensors comprise ultrasonic sensors for measuring distance in the preferred embodiment, however any other suitable systems capable of measuring a distance could be used in further embodiments. In the preferred embodiment, a first ultrasonic sensor defines the first boundary sensor 110, a second ultrasonic sensor defines the height sensor 108, and a third ultrasonic sensor defines the second boundary sensor 112.

As described herein, the control assembly 10 is operable in either one of a first mode, a second mode, or a third mode.

Figure 18:
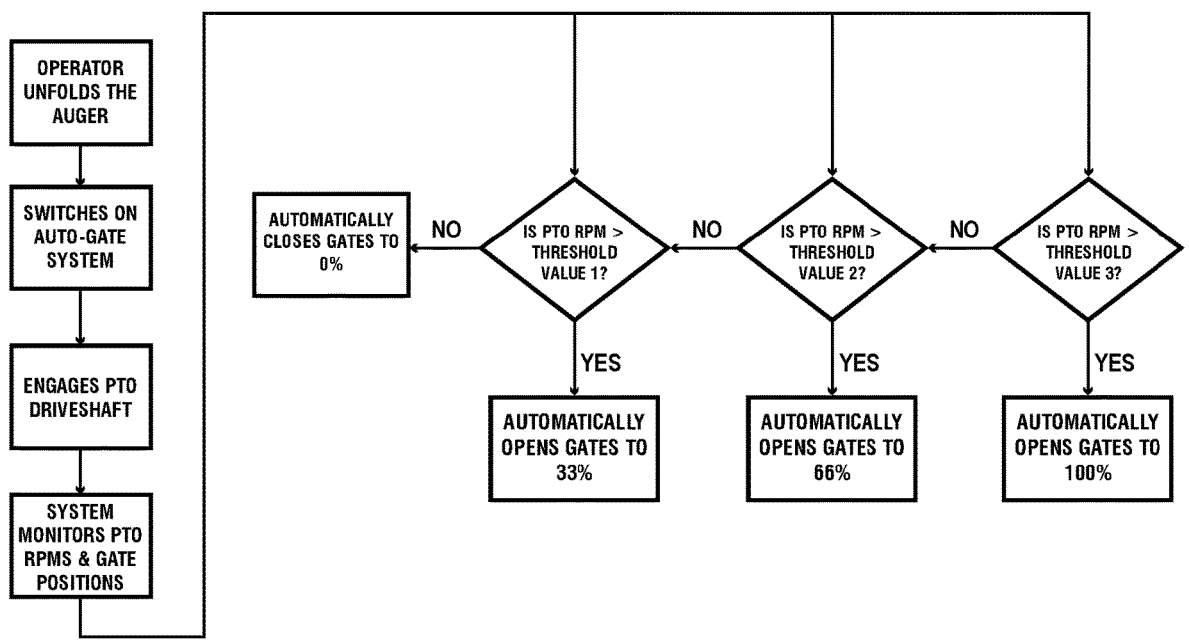
FIG. 18 is a flowchart representing a first mode of operation of the control assembly in which the gate of the grain cart is controlled relative to the RPM of the PTO of the tractor that operates the grain cart.
Figure 19:
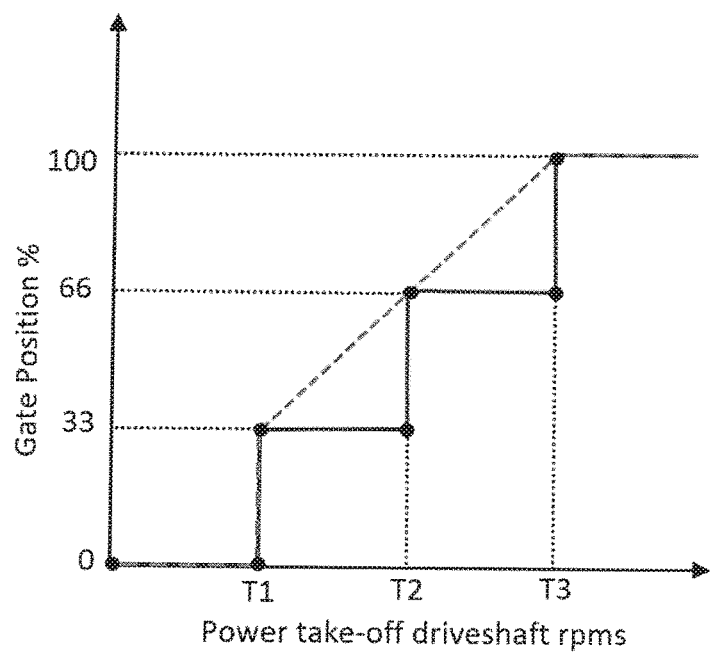
FIG. 19 is a graphical representation of a plurality of thresholds when operating the gate of the grain cart proportionally to the RPM of the PTO of the tractor in either step-wise or linear relationships.

The first mode is best shown in FIG. 18 in which the position of the gate is only operated proportionally to speed of rotation of the PTO shaft as determined by the speed sensor. With reference to FIG. 19 as well, the controller may store values thereon corresponding to a first minimum threshold T1, a second intermediate threshold T2 and a third upper threshold T3. In this instance, the system continuously monitors the speed of rotation as determined by the speed sensor. At any time, if the measured speed fall below the minimum threshold T1, the controller generates appropriate signals for the gate actuator to fully close the gate assembly. Once the measured speed returns above the minimum threshold, the controller partially opens the gate assembly to a first intermediate position, for example corresponding to the gates being 33% open. If the measured speed continues to increase beyond the intermediate threshold T2, the controller opens the gate assembly to a second intermediate position, for example corresponding to the gates being 66% open. If the measured speed increases above the upper threshold T3, the controller fully opens the gate assembly. As the speed of rotation measured by the speed sensor continues to change, and falls within (i) a lower region below the first threshold, (ii) a first intermediate region between the first and second thresholds, (iii) a second intermediate region between the intermediate and upper thresholds, or (iv) a fourth region above the upper threshold, the controller continues to generate appropriate signals to partially open the gate, partially close the gate, fully open the gate, or fully close the gate as outlined herein.

The operation of opening and closing of the gates is typically accomplished by generating suitable opening or closing signals to continue to open or close the gate towards a desired position until the feedback from the gate position sensor indicates that the desired position has been reached, at which point the controller ceases to generate any control signals for the gate actuator so that the gate actuator stops at the desired position.

Figure 20:
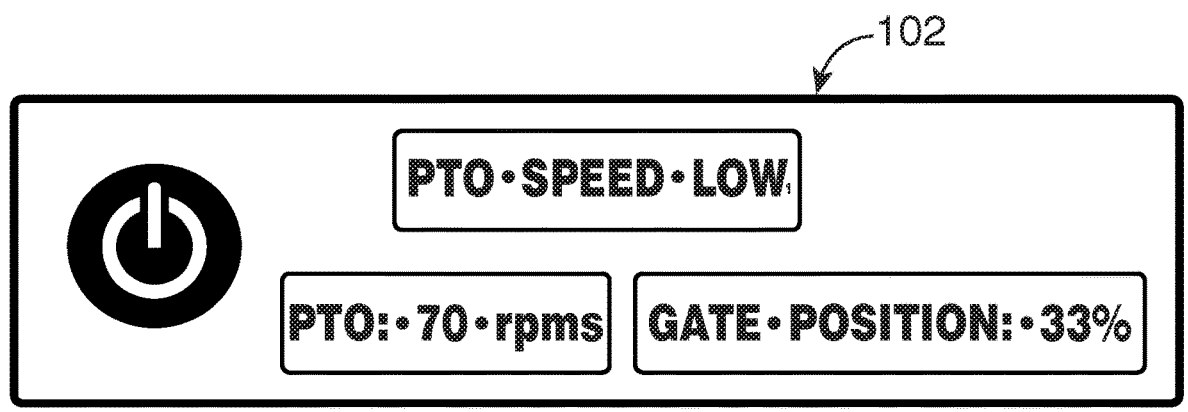
FIG. 20 is an illustration of the display screen of the controller when operated according to the first mode of operation.

In the first mode of operation, the display may be configured as shown in FIG. 20 to indicate within which region the rotation speed measured by the speed sensor falls, to indicate the measured speed of rotation, and to indicate the position of the gate as sensed by the gate sensor. A power switch to activate the operation of the controller can also be provided on the display interface as illustrated.

Figure 4:
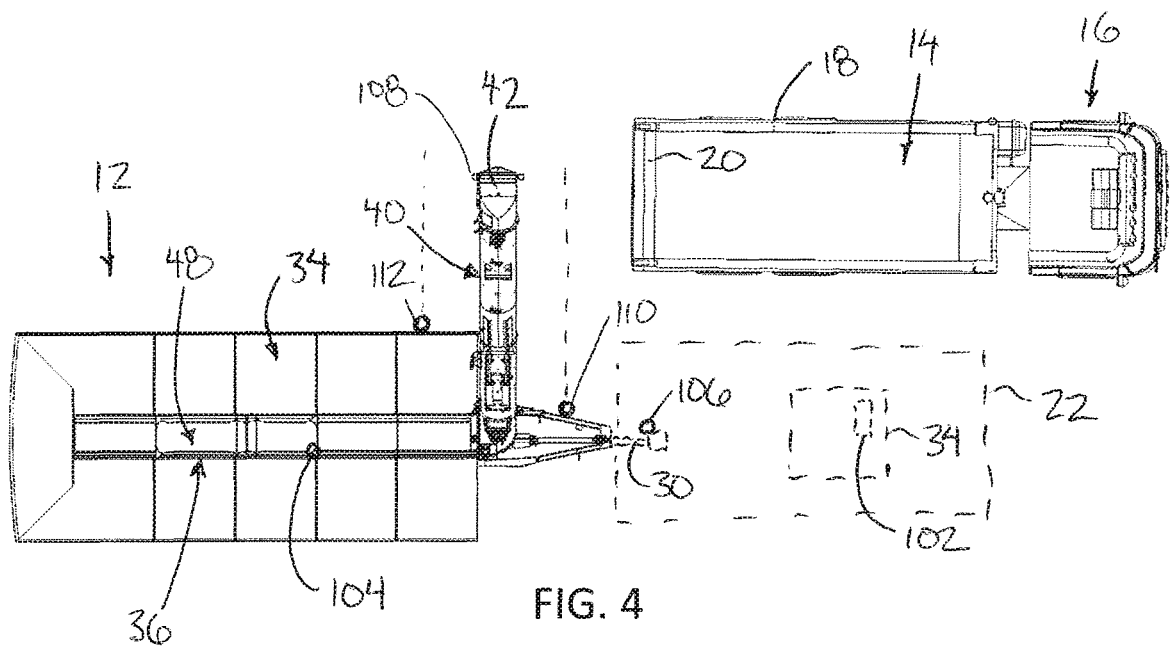
FIGS. 4 through 8 are top plan views of the unloading sequence of the grain cart relative to the grain truck.
Figure 5:
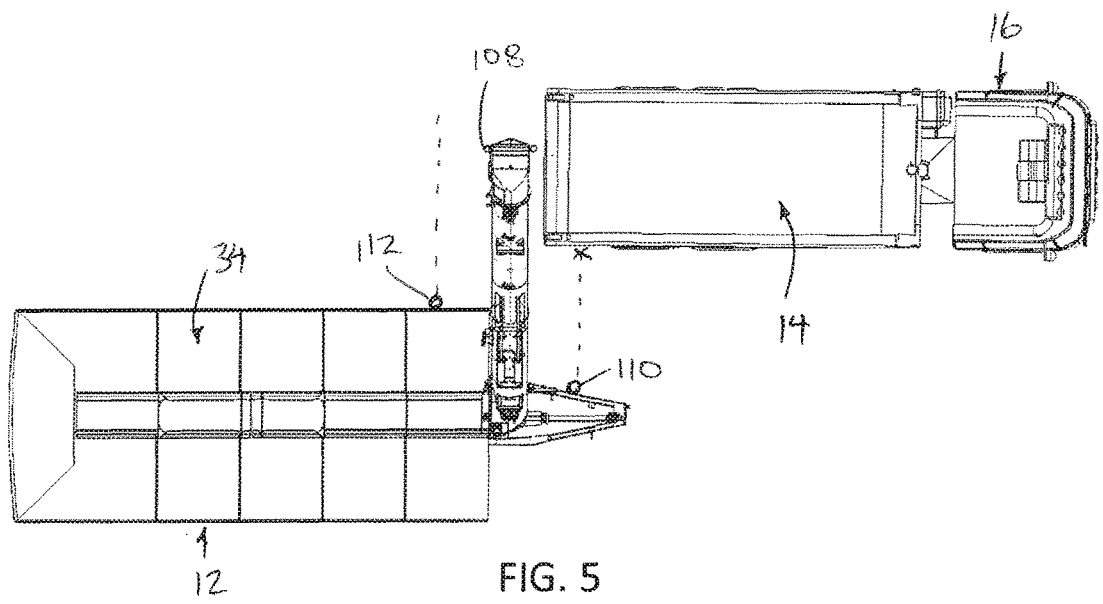
Figure 6:
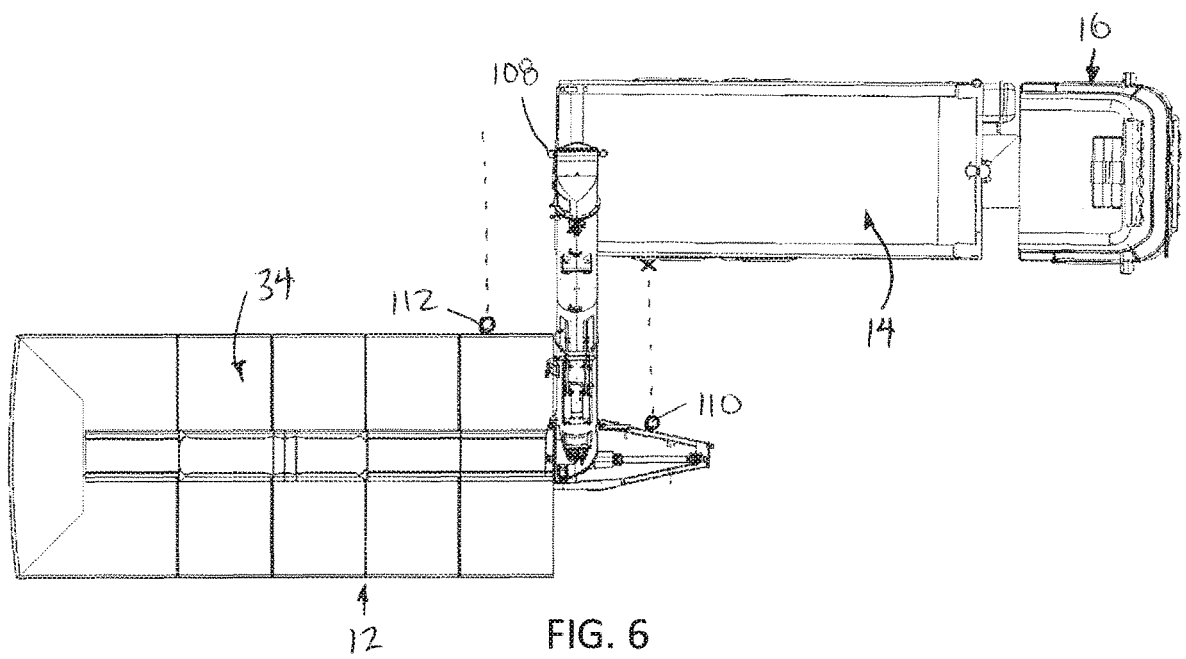
Figure 7:
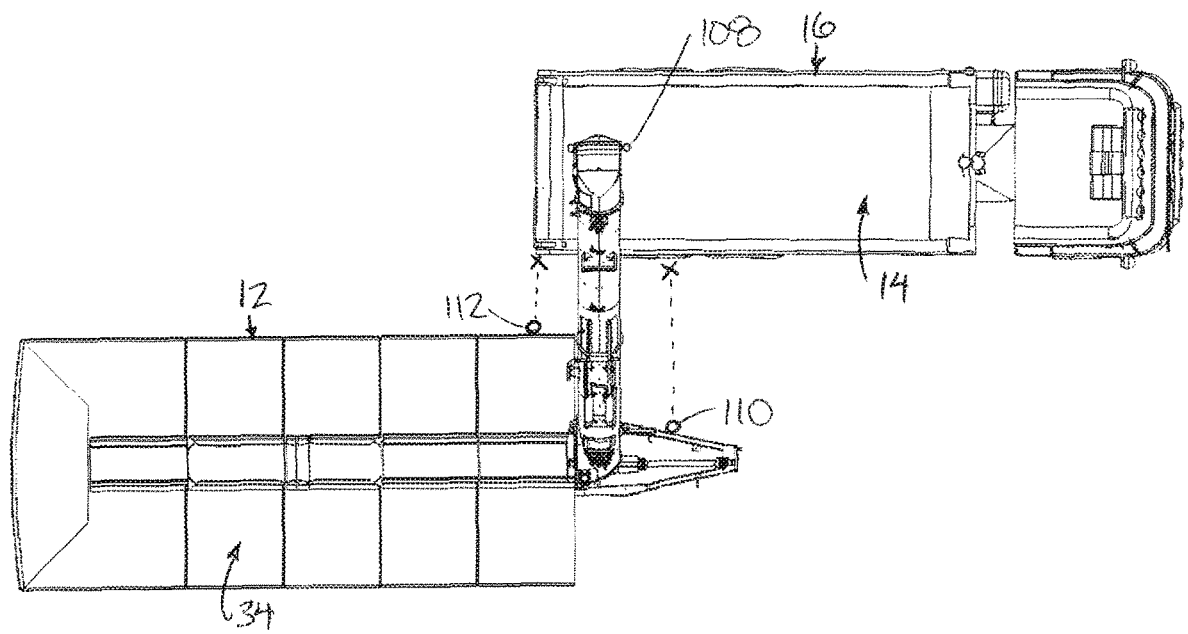
Figure 8:
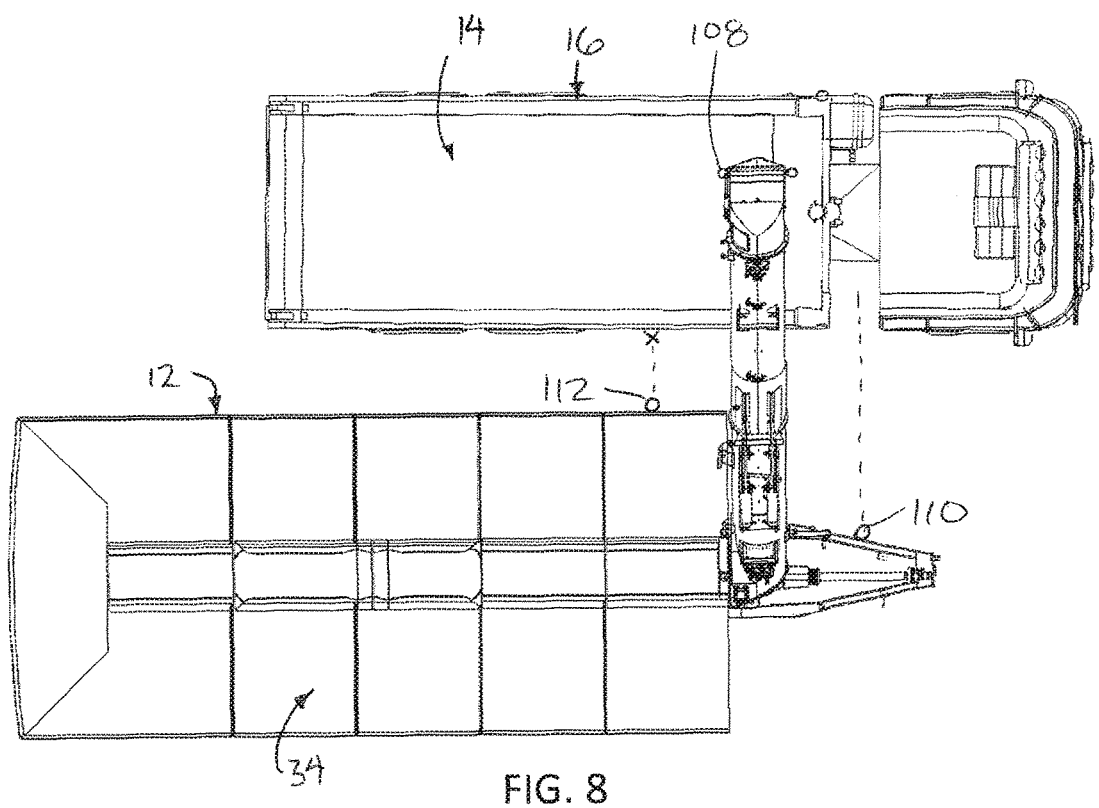
Figure 21:
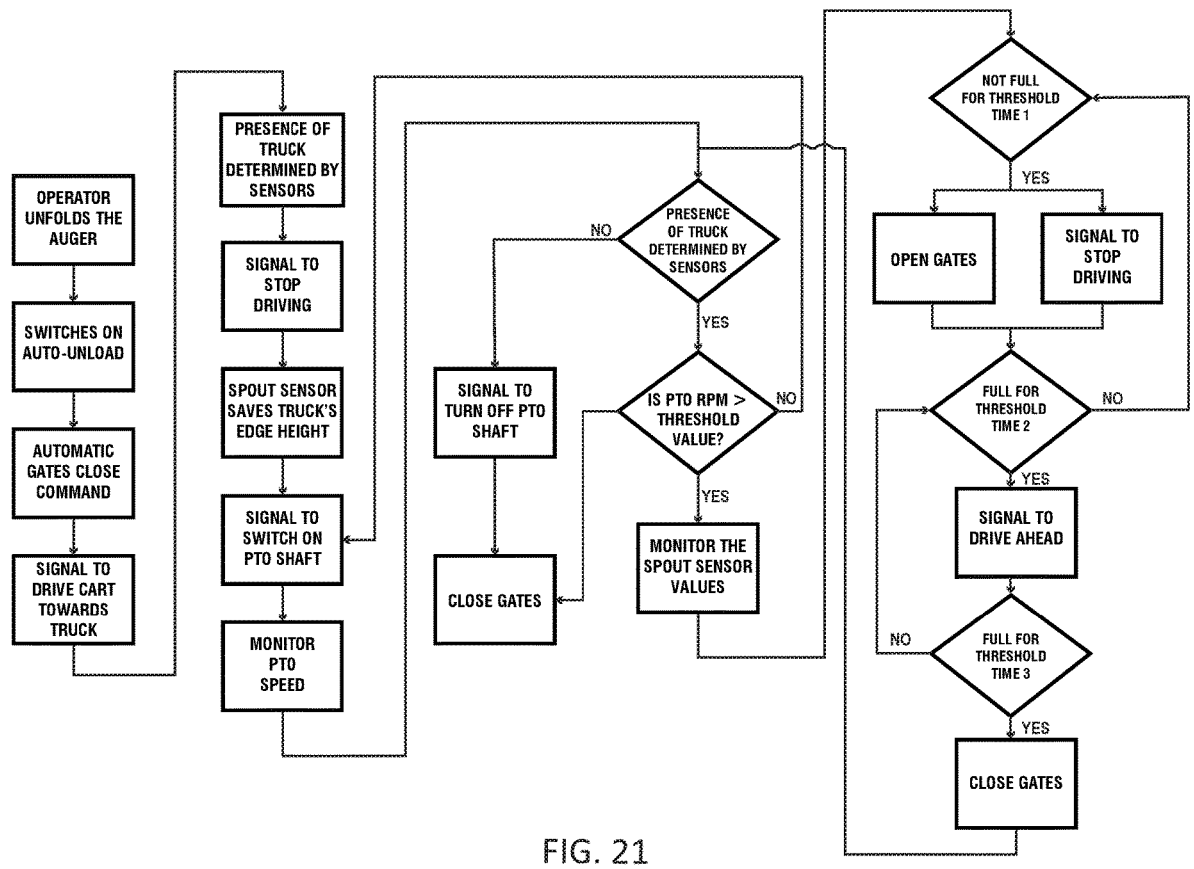
FIG. 21 is a flowchart representing a second mode of operation of the control assembly in which the position of the grain cart relative to the receiving container of the grain truck is guided by the control assembly.

The second mode of operation is best shown in FIG. 21. When the operator initially activates the control assembly according to the second mode of operation, the controller must first calibrate itself relative to the grain truck. The gates of the grain cart are initially closed and directions are provided in the form of a suitable notification signal generated by the controller for display on the operator interface to direct the operator to drive the drain cart into position alongside the grain truck. The boundary sensors and the height sensor are active to begin sensing proximity of the grain truck. As the operator advances from a starting position shown in FIG. 4 to the position of FIG. 5 in which the first boundary sensor begins to detect presence of the boundary wall of the grain truck, the controller begins monitoring the measured height from the height sensor. The measured height from the height sensor is continued to be measured as the spout crosses over the rear boundary of the receiving container as shown in FIG. 6 and until the second boundary sensor 112 begins to detect the presence of the boundary wall of the receiving container as shown in FIG. 7. This corresponds to a calibration step where the shortest vertical distance measured from the height sensor is determined to be the greatest height or highest peak of the boundary walls of the receiving container which corresponds to the height of the top edge of the rear gate panel of the truck. This value is recorded is the height threshold on the controller during continued operation of the grain cart being unloaded into the grain truck. The controller then generates a suitable notification signal to be displayed on the display to the operator to instruct the operator to activate the PTO shaft of the tractor which in turn causes the unloading auger to begin operating.

According to the second mode of operation, the controller stores a minimum threshold therein and monitors the speed of rotation measured by the speed sensor to ensure that the speed of the PTO shaft remains above the minimum threshold. Anytime the measured speed falls below the minimum threshold, the controller generates suitable signals to cause the gate actuator to close the gate assembly.

Provided that the minimum threshold for PTO shaft speed is met, the controller continues to monitor the signal from both boundary sensors to ensure that the spout of the grain cart remains within range between front and rear boundaries of the receiving container. If the spout remains within the boundaries of the receiving container, the controller checks that the distance measured by the height sensor is greater than the minimum distance used for determining peak height threshold, that is the controller determines if the height of the object being measured by the height sensor is below the height threshold. When the measured height falls below the height threshold and remains below the height threshold for a first prescribed duration, the controller determines that the receiving container has further capacity to receive more grain such that the controller notifies the operator to stop driving and the gates are signalled by the controller to open so that material from the grain cart begins to fall through the discharge opening into the unloading auger for transfer into the grain cart and for filling the receiving container to a maximum height at the current location. Once the height sensor determines that the fill height within the receiving container has reached the height threshold and remains at or above the height threshold for a second prescribed duration, the controller generates a notification signal to the operator to drive forwardly to move the spout to a new location relative to the receiving container which should not yet be filled to the maximum height. Once the notification signal has been sent, the controller begins measuring a third prescribed duration and if the sensed height remains at the height threshold upon expiry of the third duration, the controller will generate suitable signals for closing the gate assembly to prevent further transfer of material from the grain cart to the grain truck.

The process continues in real-time such that upon closing of the gates, the system again checks the boundary sensors to ensure the spout remains between the front and rear boundaries of the receiving container followed by a confirmation that the power takeoff shaft speed remains above the minimum threshold. If these conditions are met, the controller again checks the height as measured by the height sensor. If the operator has advanced the grain cart forwardly so that the spout is aligned with a location which is not been filled to the maximum height, the controller will determine that the measured height is below the height threshold so that a new notification signal for the operator to stop driving is generated and the gates are again opened to continue the transfer of material.

The process continues in this manner, such that the gates are enabled to be open only while the PTO speed remains above the minimum threshold and the spout remains between the front and rear boundaries of the receiving container as determined by the boundary sensors. The controller will close the gates if either of these conditions is not met. Furthermore, each time the height sensor determines that the fill height of material at the current location of the spout has reached the height threshold, the operator is initially given a first period of time subsequent to a notification to advance the spout to a new fill location. This permits continued transfer of material if the height of the new location is below the height threshold, but causes the gates to close if the operator does not relocate the spout to a location where the height is below the height threshold within the corresponding prescribed duration following the notification. Once the operator has relocated to a location where the height is determined to be below the maximum height threshold, suitable instruction is provided to the operator to stop driving so the operator remains at that location until the height threshold is met for the corresponding prescribed duration at which point the process repeats and the operator is instructed to move forwardly again.

In addition to the processes outlined above, the controller also monitors the value of the lateral distance measured by each boundary sensor. In addition to programming or calibrating the height threshold upon initial approach of the grain cart alongside the grain truck, the controller also records a lateral distance upon initial detection of the distance to the boundary wall for the boundary sensors during the approach as shown in FIGS. 4 through 7. The controller uses the recorded lateral distance to calculate a first lateral threshold and a second lateral threshold which define the limits of a permissible range of lateral distances that the grain cart is permitted to be relative to the grain truck. Throughout the unloading process, the controller compares the measured lateral distances by the boundary sensors to the first and second lateral distance thresholds. In the event that the lateral distance measured by the boundary sensors falls below the first lateral distance threshold, the controller responds by notifying the operator with a first notification signal which instructs the operator to steer in a first direction to return the measured lateral distance to the permissible range. Likewise, in the event that the lateral distance measured by the boundary sensors is above the second lateral distance threshold, the controller responds by notifying the operator with a second notification signal which instructs the operator to steer in a second direction to return the measured lateral distance to the permissible range.

Figure 22:
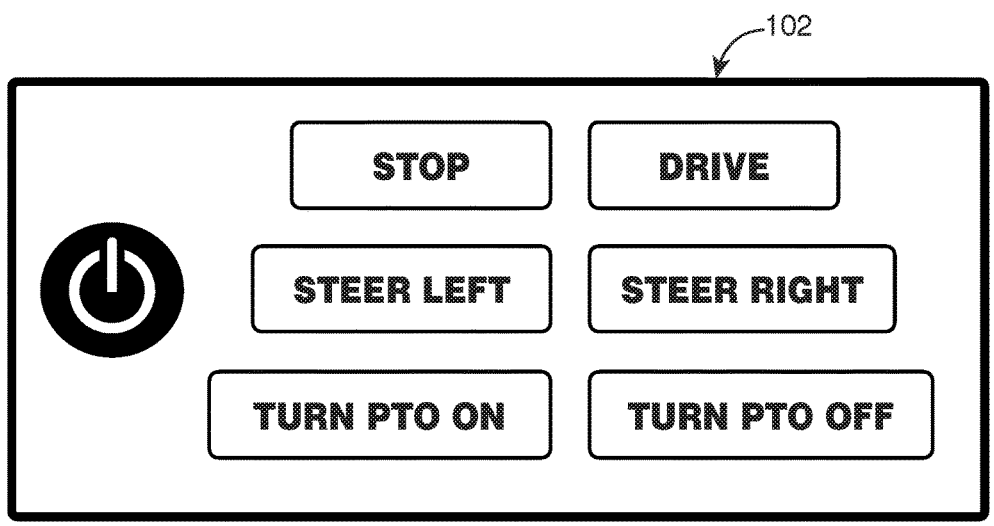
FIG. 22 is an illustration of the display screen of the controller when operated according to the second mode of operation.
Figure 23:
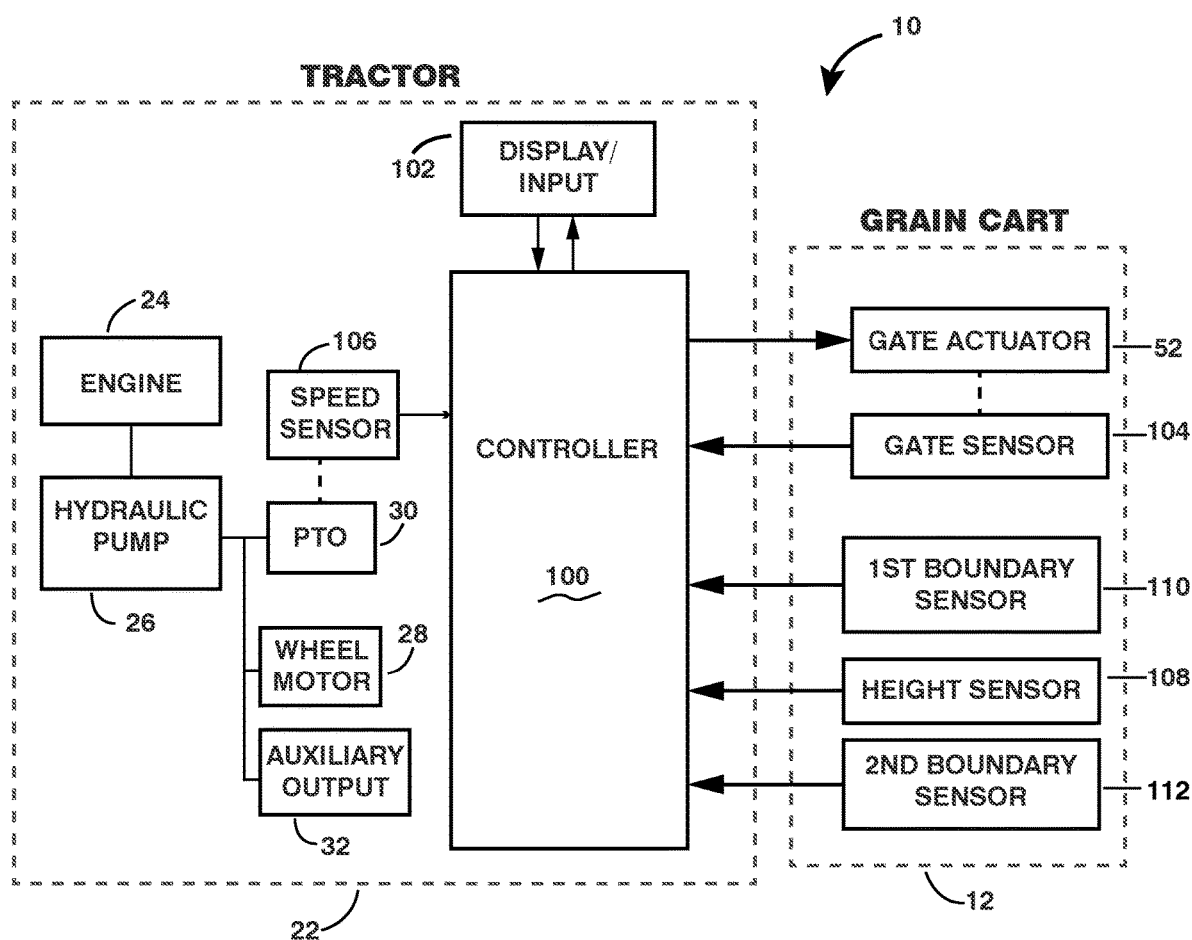
FIG. 23 is a schematic representation of the various components of the control assembly for assisting in the unloading of a grain cart according to either mode of operation.

The display screen according to the second mode of operation may be configured as shown in FIG. 22 in which input can be received from the operator for turning the system on and off in the manner of a power button. Also, as shown in FIG. 22, the display in this instance provides instructions for the driver to start or stop driving forwardly as well as for turning the PTO shaft of the tractor on or off. The display is further arranged to be responsive to the first and second notification signals which instruct the operator to steer in first and second directions respectively.

According to the third mode of operation, the system operates generally according to the second mode of operation as outlined above; however, in this instance instead of fully opening the gate each time it is determined that the gate should be fully opened above the minimum threshold, the controller instead opens the gate proportionally according to the multiple thresholds represented in FIG. 19 and described in relation to the first mode of operation. Accordingly, in the third mode of operation the system effectively combines the functionality of the first and second modes of operation.

As described herein, according to the first mode of operation of the control assembly, to control and monitor the grain cart, a controller and sensors have been mounted onto the grain cart. The entire system is monitored by an operator who sits in the cab of the tractor. Shown in the figures is an optional display panel mounted inside the tractor cab that includes a system ON/OFF button, PTO speed low warning light, real time PTO rpm values and gates position. The process in this instance typically involves the following steps:

(1) The tractor operator unfolds the grain cart auger and switches on the Auto-gate system.

(2) The operator drives towards the truck and positions the grain cart to begin the unloading process. He then engages the PTO driveshaft of the tractor which drives the grain cart auger.

(3) Once the PTO rpm reaches a certain predetermined threshold value 1, the auger gates automatically open to a preset value (for e.g. 33%) and the unloading begins.

(4) The PTO sensor continuously monitors the rpms of the PTO driveshaft and prompts the operator if the PTO speed drops down to a value deemed unsafe for unloading.

(5) Next, if the PTO rpm is greater than threshold 2, gates open to 66% or to 100% if the PTO rpm is greater than threshold 3.

(6) As the operator drives the grain cart forward, if the tractor engine starts to stall and the PTO rpms drop, the gates automatically close to a preset value until the PTO rpms catch up again, preventing any tractor stalls.

FIG. 18 is a flow chart that illustrates a typical unloading sequence performed in accordance with the first mode of operation.

At first step, the operator unfolds the auger, positions the grain cart for the unloading process and switches on the auto-gate system (the controller and sensors are powered on). Next, the operator engages the PTO driveshaft. A sensor monitors the speed of the PTO driveshaft and prompts the operator to increase the PTO rpms until it reaches a minimum pre-determined speed (threshold 1) at which the auger may be safely loaded with grain.

Next, when the PTO rpm reaches threshold 1 (T1), the system automatically opens the hopper gates to a predefined position (for e.g. 33%) to load the auger with grain and begin unloading. The system continuously monitors the PTO driveshaft rpms and notifies the operator if the rpms drop below a pre-determined value (threshold T1), and closes the gates to prevent a stall. Next, when the PTO rpms reach threshold 2 (T2), the hopper gates automatically open to 66%. The hopper gates automatically open to 100%, in response to a determination that the power takeoff speed is above the threshold 3 (T3). At this point, as the operator drives the cart forward to carry on with grain unloading, if the tractor engine starts to stall and the PTO rpms drop below any threshold value, the gates close to 66% or 33% or 0% in accordance with the PTO rpms, preventing any stalls to happen. As the grain cart approaches the end of the truck, the operator switches off the PTO driveshaft and as the PTO rpms drop below T1, the system closes the gate automatically to finish the unloading process. It must be noted that the gate opening positions can be set to follow a certain predefined curve based on the PTO rpms (and not just a step as discussed above). For example, as shown in FIG. 19, the gate opening could be either a step (shown in solid line) or a linear ramp (shown in broken line).

As described herein, according to the second mode of operation, to control and monitor the grain cart, a controller and several ultrasonic sensors have been mounted onto the grain cart to collect data and carry out commands. The controller and sensors are connected to a display/light panel mounted in the cab of tractor. The display/light panel may display data collected from the sensors or commands that may be issued to the operator. The entire system is monitored by an operator who sits in the cab of the tractor. Shown below is display/light panel that includes a system ON/OFF button and a plurality of signals. The process in this instance typically involves the following steps:

(1) Grain cart operator unfolds the auger, sets the pivot angle and then switches on the Auto-unload system (controller and ultrasonic sensors are powered ON).

(2) The system then prompts the operator to drive towards the truck.

(3) As the operator drives parallel to the truck, the first sensor "1" detects the wall of the truck first and becomes active.

(4) As the operator drives ahead, the ultrasonic sensor "3" on the spout is continuously measuring the distance of the all the objects it detects. The controller, however, only saves the highest value this sensor measures into its memory. This highest edge distance is treated as the desired peak for the grain height in the truck.

(5) Next, as operator drives forward, sensor "2" detects the presence of truck and signals the operator to stop. At this moment, the controller saves the distance between the truck and the grain cart by reading the sensor "2" value. This value serves to keep the grain cart parallel to the truck when the unloading begins. If this sensor's readings deviate outside a threshold, it prompts the operator to steer "left" or "right" to keep the cart parallel.

(6) After the sensor "2" stays active for a certain predefined time and the operator has positioned the implement, the system is ready to begin the unloading process. The "PTO ON" light flashes, prompting the operator to engage the PTO driveshaft. The operator switches on the PTO driveshaft of the tractor which drives the grain cart auger.

(7) Once the PTO rpm reaches a certain predetermined value, the auger gates automatically open and the unloading begins.

(8) As the grain is being unloaded into the truck, the sensor "3" on the spout is continuously monitoring the distance of the pile of the grain filling up. When the measured height is equal to the required height, the system prompts the operator to drive forward to form the next grain pile.

(9) At this time, if the driver does not drive forward, after a certain threshold time, the auger gates automatically close to avoid any overspill.

(10) When the operator drives forward, the gates will automatically open again if the measured sensor value is lesser than the required height.

(11) The unloading process continues and at each pass a pile of grain is formed.

(12) Sensors "1" and "2" make sure that the unloading only happens when the auger is within the bounds of the truck trailer.

(13) When the sensor "1" is OFF and sensor "2" is ON (i.e. at the last pass), the gates automatically close again and the "PTO OFF" light starts to flash, prompting the operator to turn off the PTO driveshaft.

FIG. 21 is a flow chart that illustrates a typical unloading sequence performed in accordance with the second mode of operation. At first step, the operator unfolds the auger and switches on the auto-unload system. The controller and sensors are powered on. At this step, as a safety precaution, the gate close command is send from the controller. Next, a signal is flashed on the light panel, prompting the driver to drive towards the truck.

Figure 9:
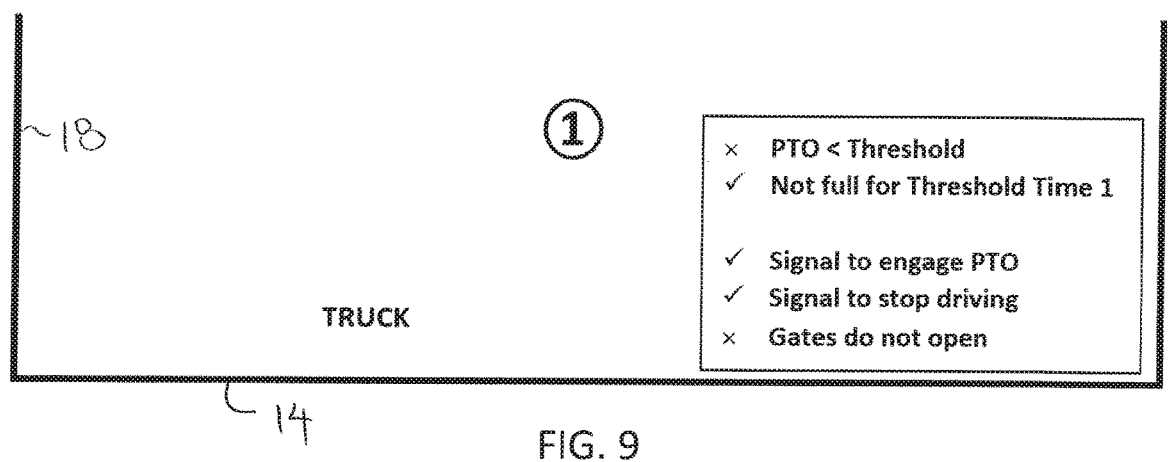
FIGS. 9 through 17 are schematic elevational views of the unloading of grain from the spout of the grain cart into the receiving container of the grain truck as a sequence of steps.

Presence of truck is determined next when both the side auger sensors become active. At this moment, the operator is asked to stop driving the cart and the controller saves the truck edge height, which serves as the peak grain height required at each pass when unloading grain. Next, the operator is asked to switch on the PTO driveshaft. A sensor monitors the rpms of the PTO driveshaft and prompts the operator to increase the PTO rpms until it reaches a pre-determined speed at which the auger may be safely loaded with grain according to step 1 in FIG. 9.

Figure 10:
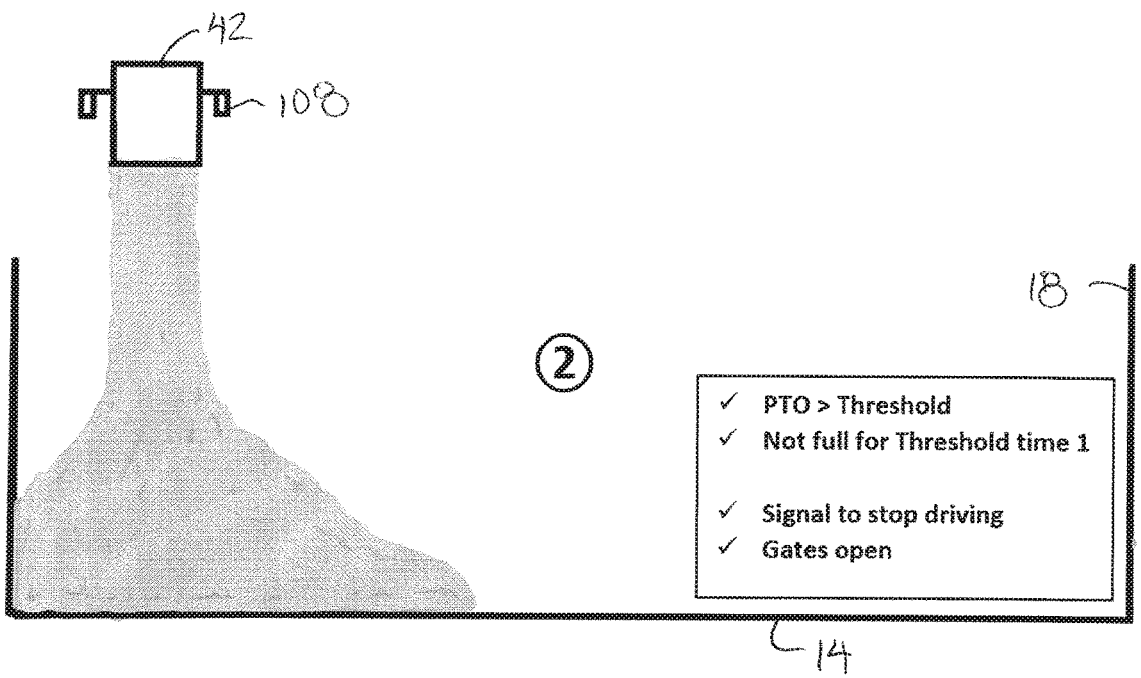

Next, when the PTO rpm reaches its threshold, the spout sensors start monitoring the grain height being filled in the truck. If the grain height has not reached to the required height, the system automatically opens the hopper gates to load the auger with grain and begin unloading according to step 2 in FIG. 10.

Figure 11:
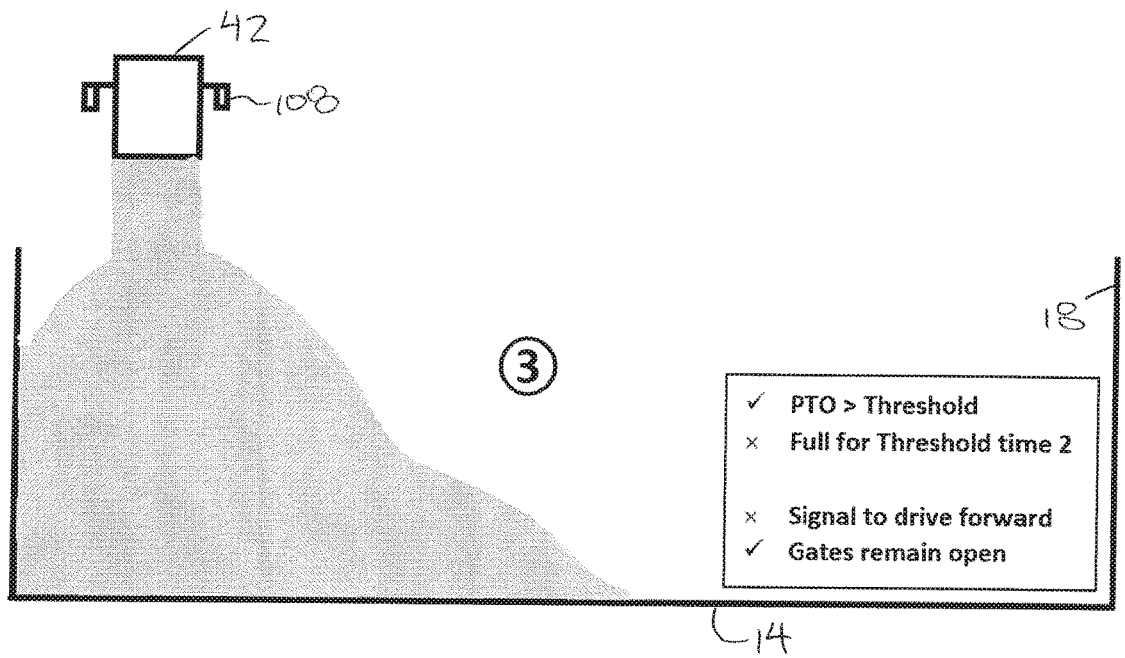

The system always notifies the operator if the rpms of the PTO driveshaft drop below a pre-determined value, and closes the gates to prevent a stall. Next, when a pre-determined grain height has been reached (when sensor reading is equal to the required height) for threshold time 2, the driver is prompted to drive forward according to step 3 in FIG. 11.

Figure 12:
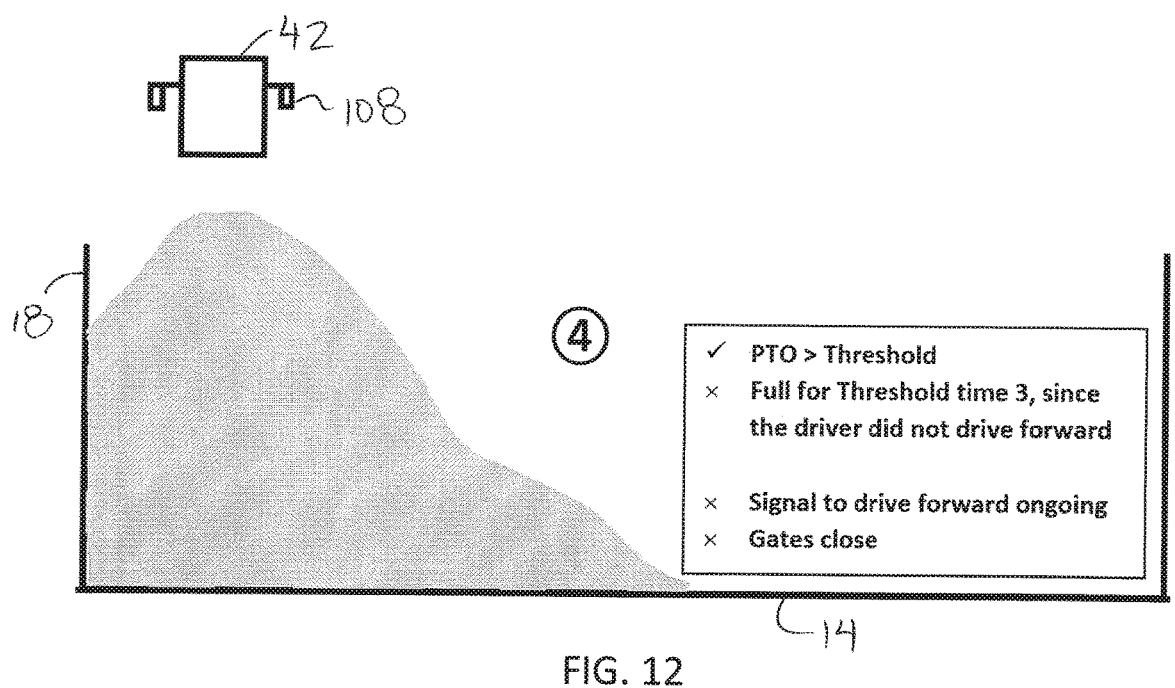

During the time interval between threshold 2 and threshold 3 if the driver does not drive forward, the hopper gates closes automatically to prevent overfilling the truck and avoids spill according to step 4 in FIG. 12.

Figure 13:
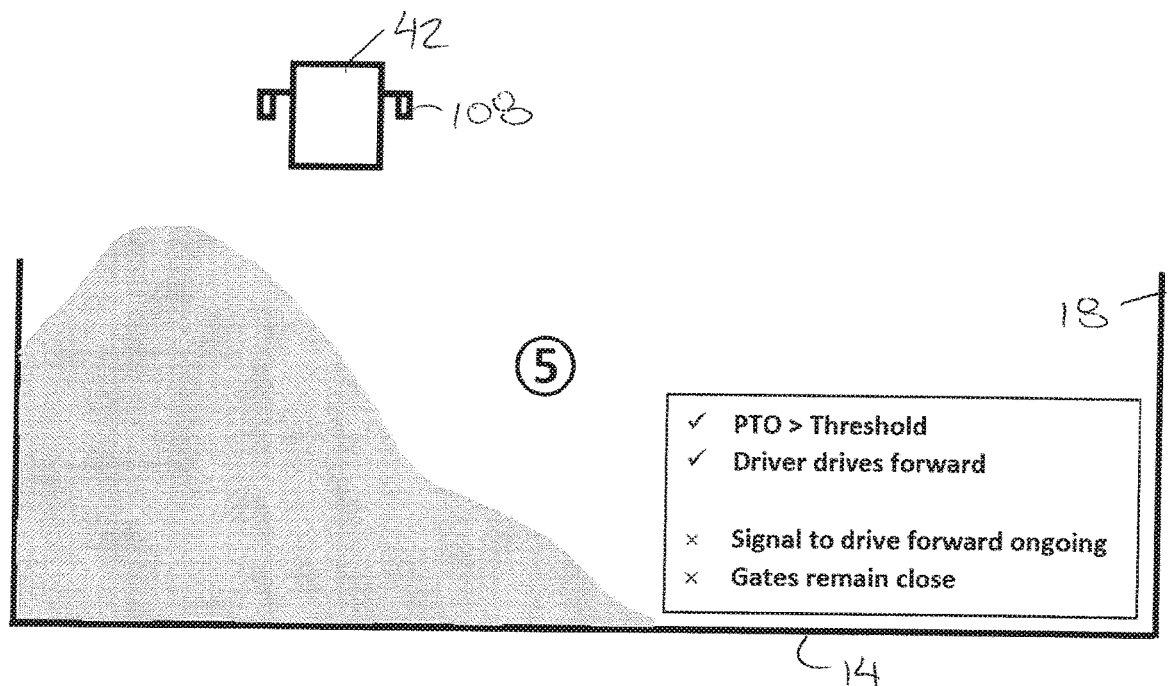
Figure 14:
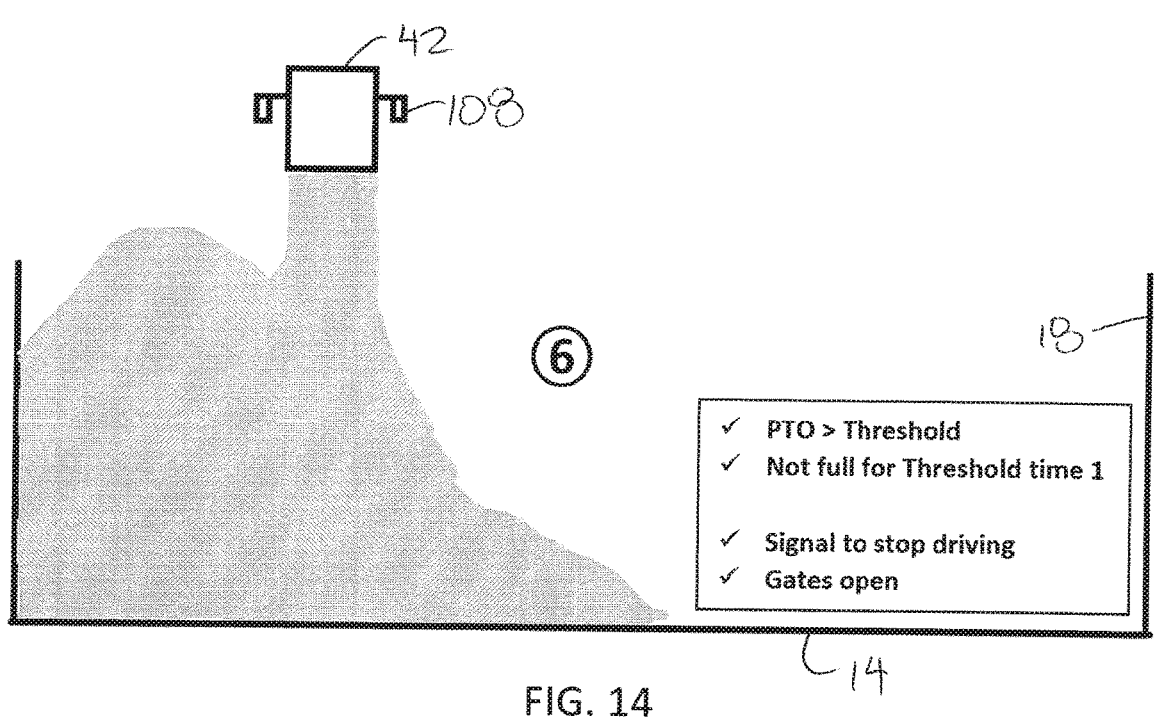

When the driver drives forward, according to step 5 in FIG. 13, the hopper gates automatically open again, in response to a determination that the spout sensor value is less than the required grain height and that the power takeoff speed is above the threshold. At this point the operator is signaled to stop driving according to step 6 in FIG. 14.

Figure 15:
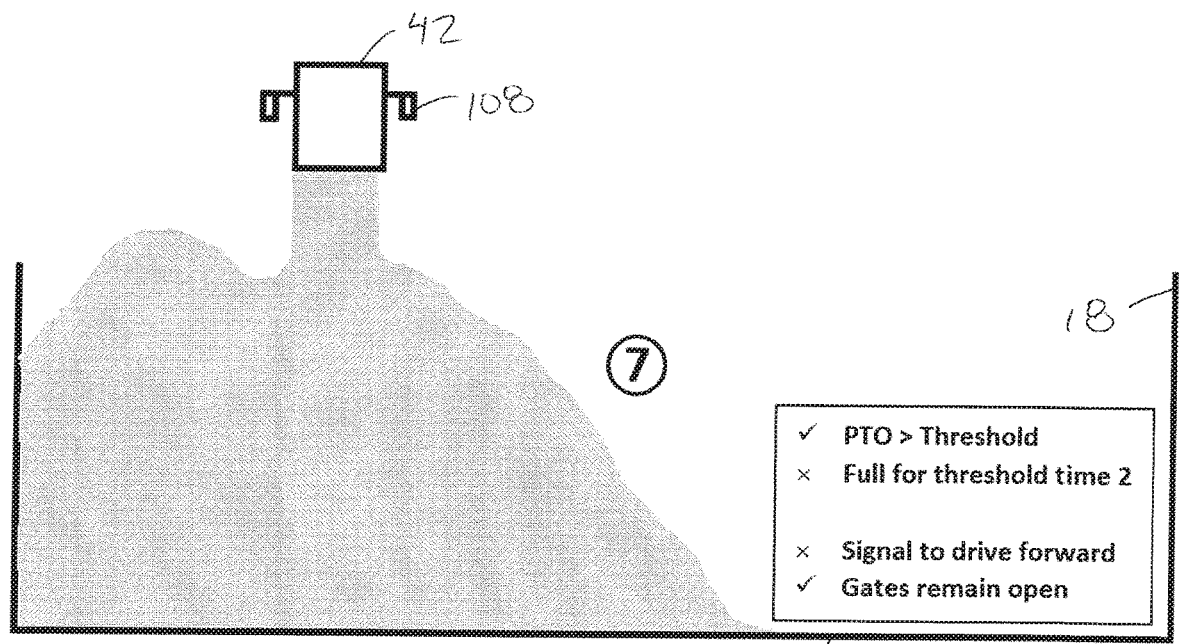
Figure 16:
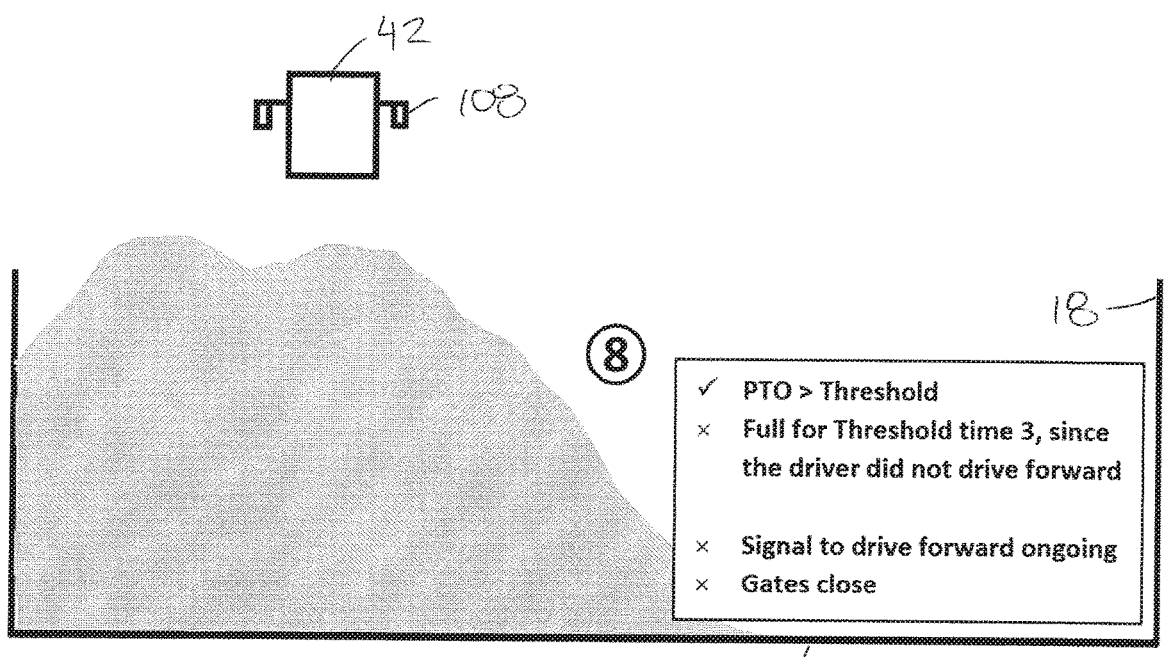
Figure 17:
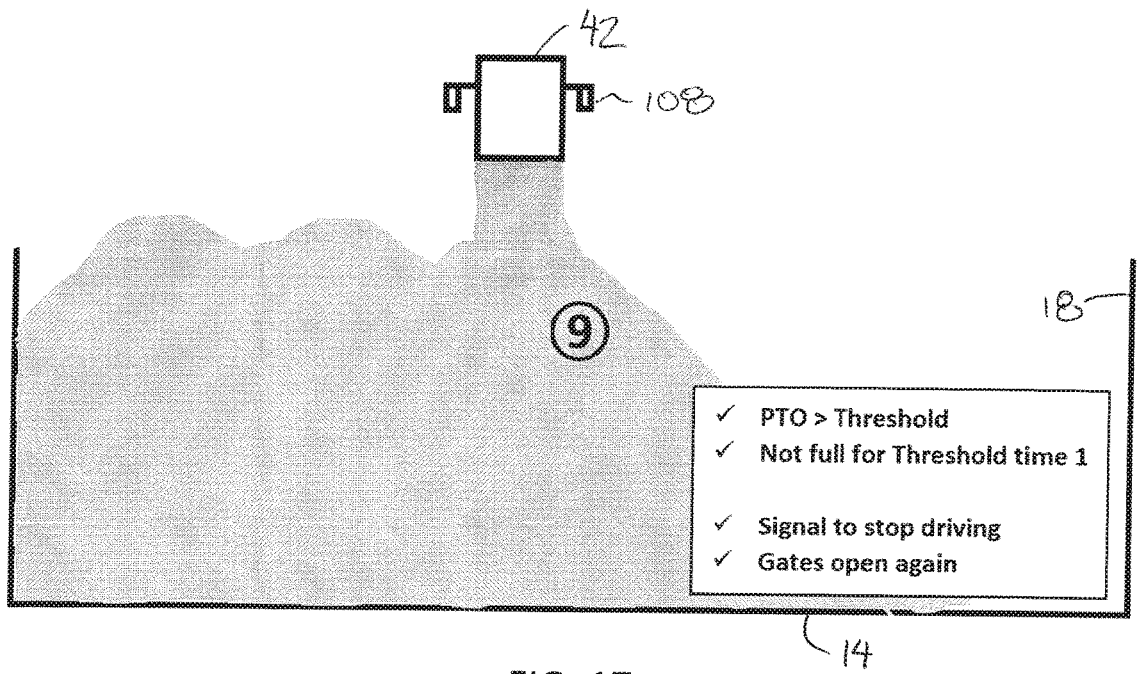

This cycle continues as long as the truck is being detected by the two side sensors on the grain cart according to steps 7 through 9 in FIGS. 15, 16 and 17.

When the height sensor is OFF and first boundary sensors is ON (truck not detected), the gates again close automatically and a signal is flashed for the operator to disengage the PTO driveshaft, thus completing the unloading sequence.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A control assembly for an agricultural implement comprising a hopper container having a discharge opening at a bottom end of the hopper container, an unloading auger supported relative to the hopper container to receive material discharged from the hopper container through the discharge opening, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, and a drive assembly adapted to connect the unload auger to a power-take-off shaft of an auxiliary implement for driving rotation of the unload auger according to a rotation speed of the power-take-off shaft, the control assembly comprising:
   a speed sensor adapted to measure the rotation speed of the power-take-off shaft;
   a controller for operative communication with the speed sensor and the gate actuator;
   the controller including a memory storing a minimum threshold and programming instructions thereon and a processor for executing the programming instructions so as to be configured to:
   compare the measured rotation speed from the speed sensor to the minimum threshold; and
   generate a closing signal for the gate actuator to displace the gate at least partway towards the closed position responsive to the measured rotation speed from the speed sensor falling below the minimum threshold.

2. The control assembly according to claim 1 wherein the controller is arranged to generate the closing signal so as to displace the gate fully towards the closed position responsive to the measured rotation speed from the speed sensor falling below the minimum threshold.

3. The control assembly according to claim 1 wherein the controller is arranged to generate a partial closing signal so as to displace the gate only partway from the open position towards the closed position responsive to the measured rotation speed from the speed sensor being above the minimum threshold but falling below an intermediate threshold which is greater than the minimum threshold.

4. The control assembly according to claim 1 wherein the controller is arranged to generate a partial opening signal so as to displace the gate only partway from the closed position towards the open position responsive to the measured rotation speed from the speed sensor being above the minimum threshold but falling below an intermediate threshold which is greater than the minimum threshold.

5. The control assembly according to claim 1 further comprising a display screen for mounting in an operator cab of the auxiliary implement and wherein the controller is arranged to generate a display signal which displays the measured rotation speed from the speed sensor on the display screen.

6. The control assembly according to claim 1 further comprising a gate position sensor adapted to measure a position of the gate between the open position and the closed position thereof, the controller being arranged to actuate the gate actuator until the gate position sensor indicates that the gate has reached a position prescribed by the controller.

7. The control assembly according to claim 6 wherein the controller is arranged to generate gate signals for positioning the gate throughout a range of intermediate positions between the open position and the closed position proportionally to the measured rotation speed from the speed sensor.

8. The control assembly according to claim 1 further comprising a height sensor for being supported on the unloading auger so as to be adapted to measure a height of material discharged into a receiving container relative to the height sensor, wherein the controller is further configured to:
   compare the measured height of material from the height sensor to the height threshold; and
   generate a gate signal for the gate actuator to displace the gate at least partway towards the closed position responsive to the measured height of material from the height sensor meeting the height threshold.

9. The control assembly according to claim 1 further comprising a height sensor for being supported on the unloading auger so as to be adapted to measure a height of material discharged into a receiving container relative to the height sensor, wherein the controller is configured to:
   compare the measured height of material from the height sensor to the height threshold; and
   generate an output signal when the measured height of material from the height sensor meets the height threshold.

10. The control assembly according to claim 9 wherein the output signal comprises a notification signal for notifying an operator of the agricultural implement.

11. The control assembly according to claim 1 further comprising at least one boundary sensor for being supported on the agricultural implement so as to be adapted to measure a lateral distance therefrom to a boundary wall of a receiving container that receives material from the unload auger, wherein the controller is configured to:
compare the measured lateral distance from said at least one boundary sensor to the boundary wall of the receiving container to the boundary criteria; and
generate a gate signal for the gate actuator to displace the gate towards the closed position responsive to the measured lateral from said at least one boundary sensor meeting the boundary criteria.

12. A control assembly for an agricultural implement comprising a hopper container having a discharge opening at a bottom end of the hopper container, an unloading auger supported relative to the hopper container to receive material discharged from the hopper container through the discharge opening, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, and a drive assembly adapted to connect the unload auger to a power-take-off shaft of an auxiliary implement for driving rotation of the unload auger according to a rotation speed of the power-take-off shaft, the control assembly comprising:
a speed sensor adapted to measure the rotation speed of the power-take-off shaft;
a controller for operative communication with the speed sensor and the gate actuator;
the controller including a memory storing a gate position criteria and programming instructions thereon and a processor for executing the programming instructions so as to be configured to:
compare the measured rotation speed from the speed sensor to the gate position criteria; and
generate a gate signal for the gate actuator to displace the gate to an intermediate position between the open and closed positions responsive to the measured rotation speed from the speed sensor meeting the gate position criteria.

13. The control assembly according to claim 12 wherein the gate position criteria include a minimum threshold and an intermediate threshold and wherein the controller is arranged to generate the gate signal to displace the gate to the intermediate position responsive to the measured rotation speed from the speed sensor being above the minimum threshold but falling below the intermediate threshold.

14. The control assembly according to claim 13 wherein the controller is arranged to generate a partial opening signal so as to displace the gate only partway from the closed position towards the open position responsive to the measured rotation speed from the speed sensor being above the minimum threshold but falling below the intermediate threshold.

15. The control assembly according to claim 12 further comprising a display screen for mounting in an operator cab of the auxiliary implement and wherein the controller is arranged to generate a display signal which displays the measured rotation speed from the speed sensor on the display screen.

16. The control assembly according to claim 12 further comprising a gate position sensor adapted to measure a position of the gate between the open position and the closed position thereof, the controller being arranged to actuate the gate actuator until the gate position sensor indicates that the gate has reached a position prescribed by the controller.

17. The control assembly according to claim 16 wherein the controller is arranged to generate gate signals for positioning the gate throughout a range of intermediate positions between the open position and the closed position proportionally to the measured rotation speed from the speed sensor.

18. A control assembly for an agricultural implement comprising a hopper container having a discharge opening at a bottom end of the hopper container, an unloading auger supported relative to the hopper container to receive material discharged from the hopper container through the discharge opening and dispense the material from the unloading auger into a receiving container, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, the control assembly comprising:
a height sensor for being supported on the unloading auger so as to be adapted to measure a height of material discharged into the receiving container relative to the height sensor;
a controller for operative communication with the height sensor and the gate actuator;
the controller including a memory storing a height threshold and programming instructions thereon and a processor for executing the programming instructions so as to be configured to:
compare the measured height of material from the height sensor to the height threshold; and
generate a gate signal for the gate actuator to displace the gate at least partway towards the closed position responsive to the measured height of material from the height sensor meeting the height threshold.

19. The assembly according to claim 18 wherein the controller is arranged to generate an output signal responsive to the measured height of material from the height sensor meeting the height threshold, and generate the gate signal for the gate actuator to displace the gate at least partway towards the closed position if the measured height of material from the height sensor continues to meet the height threshold after expiration of an elapsed duration from the generation of the notification signal.

20. A control assembly for an agricultural implement comprising a hopper container having a discharge opening at a bottom end of the hopper container, an unloading auger supported relative to the hopper container to receive material discharged from the hopper container through the discharge opening and dispense the material from the unloading auger into a receiving container of an auxiliary implement, a gate operatively associated with the discharge opening, and a gate actuator for operating the gate relative to the discharge opening between an open position enabling material to be discharged through the discharge opening and a closed position spanning the discharge opening to prevent material being discharged from the hopper container into the unload auger, the control assembly comprising:

a height sensor for being supported on the unloading auger so as to be adapted to measure a height of material discharged into the receiving container relative to the height sensor;
a controller for operative communication with the height sensor;
the controller including a memory storing a height threshold and programming instructions thereon and a processor for executing the programming instructions so as to be configured to:
  compare the measured height of material from the height sensor to the height threshold; and
  generate an output signal when the measured height of material from the height sensor meets the height threshold.

* * * * *